United States Patent
Pugaczewski et al.

(10) Patent No.: US 10,122,725 B2
(45) Date of Patent: Nov. 6, 2018

(54) SYSTEM AND METHOD FOR IMPLEMENTING COMMUNITY WIRELESS COMMUNICATIONS SERVICE

(71) Applicant: CenturyLink Intellectual Property LLC, Denver, CO (US)

(72) Inventors: John T. Pugaczewski, Hugo, MN (US); Soren J. Agard, Eagan, MN (US); Daniel M. Keller, Plymouth, MN (US)

(73) Assignee: CenturyLink Intellectual Property LLC, Denver, CO (US)

( * ) Notice: Subject to any disclaimer, the term of this patent is extended or adjusted under 35 U.S.C. 154(b) by 81 days.

(21) Appl. No.: 15/269,437

(22) Filed: Sep. 19, 2016

(65) Prior Publication Data

US 2017/0339631 A1 Nov. 23, 2017

Related U.S. Application Data

(60) Provisional application No. 62/338,898, filed on May 19, 2016.

(51) Int. Cl.

| | |
|---|---|
| *H04W 48/16* | (2009.01) |
| *H04L 29/06* | (2006.01) |
| *H04L 29/12* | (2006.01) |
| *H04W 12/06* | (2009.01) |
| *H04W 88/16* | (2009.01) |

(52) U.S. Cl.
CPC ........ *H04L 63/101* (2013.01); *H04L 61/2007* (2013.01); *H04W 12/06* (2013.01); *H04W 88/16* (2013.01)

(58) Field of Classification Search
CPC .. H04L 61/2007; H04L 63/101; H04W 12/06; H04W 88/16
See application file for complete search history.

(56) References Cited

U.S. PATENT DOCUMENTS

| | | | |
|---|---|---|---|
| 9,094,256 B1* | 7/2015 | Ress | H04L 29/06 |
| 9,203,741 B1* | 12/2015 | Martini | H04L 45/30 |
| 2007/0058645 A1* | 3/2007 | Nannra | H04L 41/046 |
| | | | 370/401 |
| 2010/0145925 A1* | 6/2010 | Flinta | H04L 29/12047 |
| | | | 707/709 |

(Continued)

*Primary Examiner* — Kashif Siddiqui
(74) *Attorney, Agent, or Firm* — Swanson & Bratschun, L.L.C.

(57) ABSTRACT

Novel tools and techniques provide for implementing community wireless communications service. In some embodiments, a network gateway device might receive, from a user device via a customer gateway device, a first request for wireless access to a network. If it determines that the user device is unassociated with the customer associated with customer gateway, the network gateway might send a second request with an identifier of the user device to a WiFi server, which might generate and send a login user interface ("UI") to the user device. The user might send a response including a unique identifier, which the WiFi server might include in an access request to an authentication server. If authenticated by the authentication server, the WiFi server might send a care-of address ("COA") request to the network gateway, which assigns the COA to the user device and provides the user device with wireless access to the network.

20 Claims, 14 Drawing Sheets

(56) References Cited

U.S. PATENT DOCUMENTS

| | | | | |
|---|---|---|---|---|
| 2014/0325028 A1* | 10/2014 | Jiang | .................. | H04L 67/02 |
| | | | | 709/219 |
| 2014/0355536 A1* | 12/2014 | Muley | ............... | H04W 28/0215 |
| | | | | 370/329 |
| 2015/0244721 A1* | 8/2015 | Spencer | .................. | H04W 8/22 |
| | | | | 726/3 |
| 2017/0034820 A1* | 2/2017 | Liu | .................. | H04W 28/02 |

* cited by examiner

SYSTEM AND METHOD FOR IMPLEMENTING COMMUNITY WIRELESS COMMUNICATIONS SERVICE

CROSS-REFERENCES TO RELATED APPLICATIONS

This application claims priority to U.S. Patent Application Ser. No. 62/338,898 (the "'898 application"), filed May 19, 2016 by John T. Pugaczewski et al. and titled, "Community WiFi Solution".

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for implementing wireless communications service, and, in particular embodiments, to methods, systems, apparatus, and computer software for implementing community wireless communications service.

BACKGROUND

In order to create a ubiquitous WiFi experience for a service provider's paid Internet access customer base, it is necessary to enable a significant portion of the service provider's subscriber lines to support WiFi access for common use. This requires a way of uniquely identifying and authenticating all users of the service. However, conventional networks do not currently support such functionality.

Hence, there is a need for more robust and scalable solutions for implementing wireless communications service, and, in particular embodiments, to methods, systems, apparatus, and computer software for implementing community wireless communications service.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
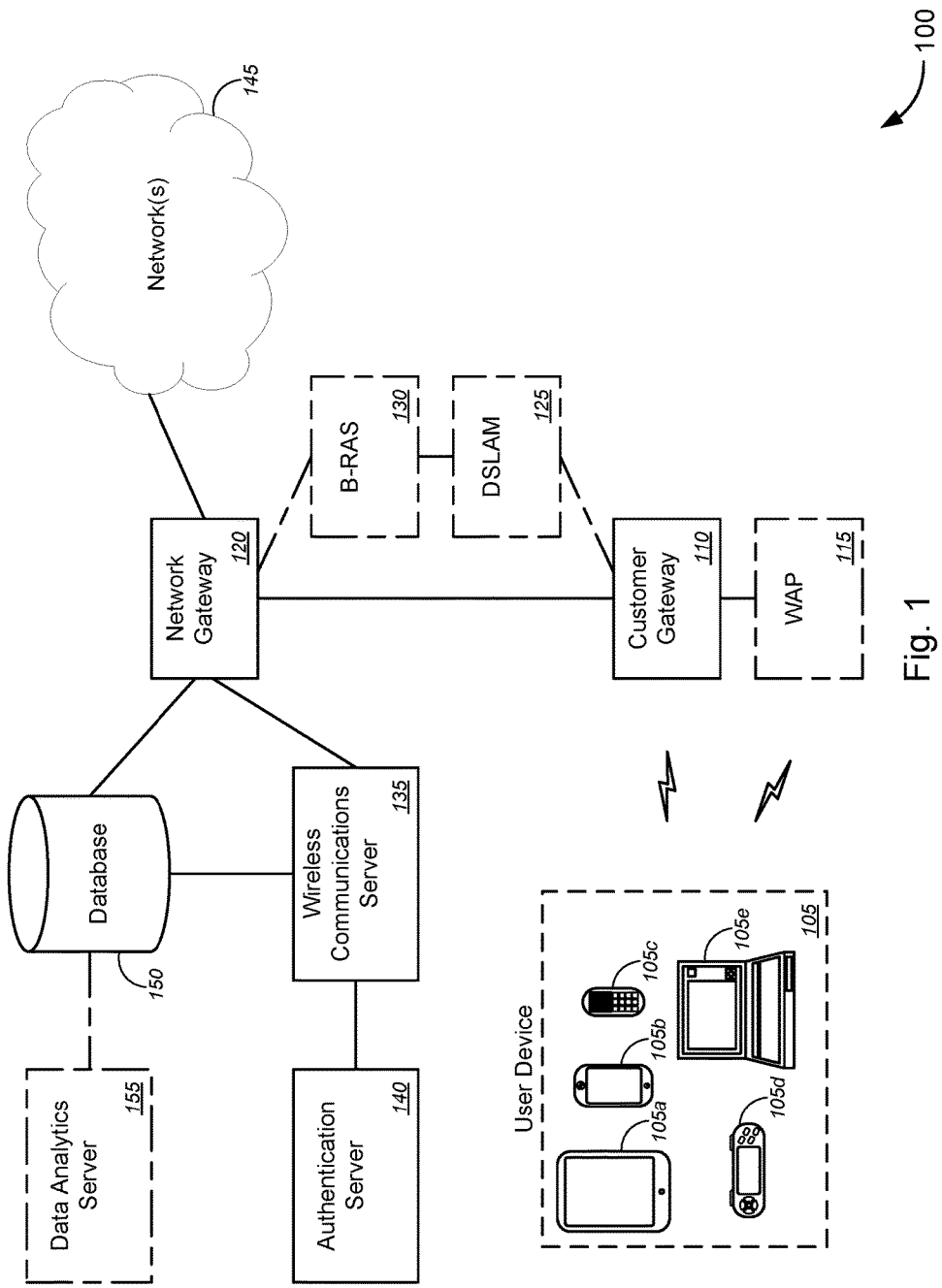
FIG. 1 is a schematic diagram illustrating a system for implementing community wireless communications service, in accordance with various embodiments.

Various embodiments provide tools and techniques for implementing wireless communications service, and, in particular embodiments, to methods, systems, apparatus, and computer software for implementing community wireless communications service.

In various embodiments, a user device might request (wireless) access to a network (e.g., the Internet, or other suitable network, and the like). In response to receiving the request via a customer gateway device (and any intermediary devices, nodes, switches, servers, etc.), a network gateway device might determine whether the user device is known (e.g., whether the user device is already associated with the customer gateway device or the network service provider, in some cases, via an access control list ("ACL") lookup or the like). If the user device is determined to be unassociated with the customer gateway device (or otherwise not known), the network gateway device might send a second request (which might include an identifier associated with the user device, including, but not limited to, a media access control ("MAC") address associated with the user device) to the wireless communications server.

In embodiments in which a cache of user identification on a database (e.g., a MongoDB or some other persistent data store, and the like) to provide login-free access for the user of the user device after having previously gained access for the first time through login authentication, the wireless communications server might query a database or data store to determine whether or not the user device has previously been granted access to the network. If so, the wireless communications server might request that the network gateway device assign a temporary Internet Protocol ("IP") address (which might include, without limitation, a care-of address or the like) to the user device, and might (optionally) store identification (e.g., the MAC address, a working telephone number ("WTN"), or other identifier associated with the user device) in the database, with an indication that the user device has again been given access. Although such storing of identification is redundant as the user device is already in the database, this might allow for tracking of how often and when the user device requests access. Meanwhile, the network gateway device might send an acknowledgement of the request for temporary IP address back to the wireless communications server, while assigning the temporary IP address to the user device and providing the user device access to the network. In some instances, the wireless communications server might generate and send a welcome user interface ("UI") to the user device. Upon being provided network access and/or receiving the welcome UI, the user device can proceed to exchange data other devices over the network, via the customer gateway device and the network gateway device (and any intermediary devices).

In the case that it is determined that the user device has not previously been granted access to the network (either previously denied access or the current access request being a first access request) or in the embodiments that the user of the user device is required to login each time that access to the network is requested through the customer gateway device that is not associated with the user, the wireless communications device might generate and send a login UI to the user device (via the network gateway and via the customer gateway). The user or the user device might send a unique identifier (including, but not limited to, a working telephone number ("WTN") or the like that is associated with the user device). Upon receiving the unique identifier, the wireless communications server might send an access request to the authentication server, which might determine whether the user device or the user associated therewith is permitted to access the network, e.g., if the user is a customer or subscriber of the network service provider, albeit typically through (or associated with) a different customer gateway device). If so, the authentication server might return an access accepted notification. In response to receiving the access accepted notification, the wireless communications server might request that the network gateway device assign a temporary Internet Protocol ("IP") address (which might include, without limitation, a care-of address or the like) to the user device, and might (optionally, in the embodiments where the database is used as described above) store identification (e.g., the MAC address or other identifier associated with the user device) in the database, with an indication that the user device has now been given access. Meanwhile, the network gateway device might send an acknowledgement of the request for temporary IP address back to the wireless communications server, while assigning the temporary IP address to the user device and providing the user device access to the network. In some instances, the wireless communications server might generate and send a welcome UI to the user device. Upon being provided network access and/or receiving the welcome UI, the user device can proceed to exchange data other devices over the network, via the customer gateway device and the network gateway device (and any intermediary devices).

In the case that the authentication server determines that the user device or the user associated therewith is not permitted to access the network, the authentication server might return an access denied notification. In response to receiving the access denied notification, the wireless communications server might notify the network gateway device that access has been denied to the user device, and might (optionally, in the embodiments where the database is used as described above) store identification (e.g., the MAC address or other identifier associated with the user device) in the database, with an indication that the user device has been denied access. Meanwhile, the network gateway device might send an acknowledgement of the notice back to the wireless communications server, while blocking network access to the user device. In some instances, the wireless communications server might generate and send an access denied UI to the user device.

In some embodiments, the system might further comprise data analytics server, which might communicatively couple with the database (either indirectly via intermediary devices or directly). The data analytics server might analyze how often the user device (or the user associated with the user device, not limited to using one user device) might try to access network, using his or her associated customer gateway device, using customer gateway device (i.e., someone else's customer gateway device), success rates for accessing network access as described above, denial rates for accessing network access as described above, dates and times for each attempted or requested access, and/or the like. In some cases, websites, data content, source identifiers, location of user at the time of requested access or actual access, etc. might also be tracked by network gateway device and stored in database for access requests by the user (either through his or her or customer gateway device or someone else's), and the data analytics server might analyze such tracked data, perhaps in conjunction with advertisement ("ad") generator servers or ad service provider servers, or the like, to provide targeted ads based on any combination of the types of websites that the user visits, the apps downloaded by the user, the types of media content or data content downloaded (or uploaded) by the user, the location of the user, the dates/times of network access activity of the user, and/or the like.

The system and method described above provide a way of uniquely identifying and authenticating all users of the service. Once enabled, the service provider's customers can potentially enjoy WiFi access across all access points in the service provider's coverage areas. The authentication requirements will additionally allow the service provider to fulfill all legal obligations as a service provider.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network configuration technology, network service implementation technology, network access technology, and/or the like. In other aspects, certain embodiments, can improve the functioning of user equipment or systems themselves (e.g., telecommunications equipment, service provider networks, client devices, user devices, network devices, host computing devices, network switches, customer local area networks, network components, etc.), for example, by improving the process of authentication of a user device that requests wireless access to a network through a residential, business, or virtual gateway that belongs to or is otherwise associated with someone other than the user of the requesting user device.

In particular, to the extent any abstract concepts are present in the various embodiments, those concepts can be implemented as described herein by devices, software, systems, and methods that involve specific novel functionality (e.g., steps or operations), such as the network gateway establishing a GRE tunnel between the network gateway and the customer gateway, the network gateway identifying the user device and sending a request (with an identifier of the user device) to a wireless communications server, the wireless communications server generating and sending a login UI to the user device prompting a unique identifier from the user or user device, the wireless communications server sending an access request (with the unique identifier) to an authentication server, the authentication server determining if the unique identifier is associated with a user or user device that should be granted access to the network (e.g., because it is associated with an existing customer or subscriber of the service provider, albeit typically through a different customer gateway or the like), (if user or user device is determined to be given network access) the authentication server sending an access accepted notification, the wireless communications server sending a CoA request to the network gateway, the network gateway sending an acknowledgement, assigning the CoA to the user device, and providing the user device with access to the network, and the wireless communications server generating and sending a welcome UI to the user device, and/or the like, to name a few examples, that extend beyond mere conventional computer processing operations. These functionalities can produce tangible results outside of the implementing computer system, including, merely by way of example, improving the process of authentication of a user device that requests wireless access to a network through a residential, business, or virtual gateway that belongs to or is otherwise associated with someone other than the user of the requesting user device, and/or the like, at least some of which may be observed or measured by customers and/or service providers.

In an aspect, a method might comprise receiving, with a network gateway device and from a user device via a customer gateway device, a first request for wireless access to a communications network. The user device might be unassociated with a customer who is associated with the customer gateway device. The method might further comprise determining, with the network gateway device, an identity of the user device and, based on a determination that the user device is unassociated with the customer who is associated with the customer gateway device, sending, with the network gateway device and to a wireless communications server, a second request for wireless access to the communications network, the second request for network access comprising a first identifier associated with the user device. The method might also comprise forwarding, with the network gateway device and from the wireless communications server, a login user interface to the user device, the login user interface comprising a prompt for a unique identifier, and forwarding, with the network gateway device and from the user device, a first unique identifier to the wireless communications server, the first unique identifier being associated with the user device and being different from the first identifier, wherein the wireless communications server forwards the first unique identifier to an authentication server for authentication. The method might further comprise, in response to the authentication server authenticating the first unique identifier and sending an indication that network access is to be given to the user device, receiving, with the network gateway device and from the wireless communications server, a request for a temporary Internet Protocol ("IP") address to be assigned to the user device; assigning, with the network gateway device, the temporary IP address to the user device; and providing, by the network gateway device, the user device with wireless access to the communications network.

In some embodiments, the method might further comprise establishing, with the network gateway device, a communications tunnel between the network gateway device and the customer gateway device using a tunneling protocol. Communication between the network gateway device and the user device might be through the communication tunnel via the customer gateway device. In some cases, the tunneling protocol might include generic routing encapsulation ("GRE") protocol, and the communications tunnel might include a GRE tunnel. According to some embodiments, the first identifier associated with the user device might comprise a media access control ("MAC") address associated with the user device.

Merely by way of example, in some instances, determining, with the network gateway device, the identity of the user device and sending, with the network gateway device and to the wireless communications server, the second request for wireless access to the communications network, based on the determination that the user device is unassociated with the customer who is associated with the customer gateway device, might comprise: obtaining, with the network gateway device, the first identifier from the user device; comparing, with the network gateway device, the first identifier with identifiers listed in an access control list ("ACL"); determining, with the network gateway device, whether the user device has permission to wirelessly access the communications network based on the comparison of the first identifier with identifiers listed in the ACL; and based on a determination that the user device does not have permission to wirelessly access the communications network, initiating, with the network gateway device, a hypertext transfer protocol ("HTTP") redirect operation, wherein the HTTP redirect operation comprises sending, with the network gateway device, the second request to the wireless communications server.

According to some embodiments, forwarding, with the network gateway device and from the wireless communications server, the login user interface to the user device might comprise receiving, with the network gateway device, the login user interface from the wireless communications server and sending, with the network gateway device, the login user interface to the user device via the customer gateway device. In some cases, the login user interface comprises one of a login webpage or a login web form, and/or the like, which prompts a user of the user device for the unique identifier.

In some embodiments, forwarding, with the network gateway device and from the user device, the first unique identifier to the wireless communications server might comprise receiving, with the network gateway device, the first unique identifier from the user device via the customer gateway device and sending, with the network gateway device, the first unique identifier to the wireless communications server. In some instances, the first unique identifier might comprise a working telephone number ("WTN"), or the like, associated with the user device.

In some cases, the wireless communications server might comprise a WiFi Community JavaScript ("JS") server, and the authentication server might comprise a remote authentication dial-in user service ("RADIUS") protocol server, wherein the WiFi Community JS server communicates with the RADIUS protocol server using RADIUS protocol. Alternatively, the wireless communications server might comprise a WiFi Community JavaScript ("JS") server, and the authentication server comprises a RADIUS server, wherein the WiFi Community JS server communicates with the RADIUS server using an application programming interface ("API").

According to some embodiments, assigning, with the network gateway device, the temporary IP address to the user device might comprise assigning, with the network gateway device, the temporary IP address to the user device, using dynamic host configuration protocol ("DHCP"). In some cases, the temporary IP address might comprise a care-of address. In some instances, the communications network comprises the Internet.

In another aspect, an apparatus might comprise at least one processor and a non-transitory computer readable medium in communication with the at least one processor. The non-transitory computer readable medium might have stored thereon computer software comprising a set of instructions that, when executed by the at least one processor, causes the apparatus to: receive, from a user device via a customer gateway device, a first request for wireless access to a communications network, the user device being unassociated with a customer who is associated with the customer gateway device; determine an identity of the user device; based on a determination that the user device is unassociated with the customer who is associated with the customer gateway device, send, to a wireless communications server, a second request for wireless access to the communications network, the second request for network access comprising a first identifier associated with the user device; forward, from the wireless communications server, a login user interface to the user device, the login user interface comprising a prompt for a unique identifier; forward, from the user device, a first unique identifier to the wireless communications server, the first unique identifier being associated with the user device and being different from the first identifier, wherein the wireless communications server forwards the first unique identifier to an authentication server for authentication; in response to the authentication server authenticating the first unique identifier and sending an indication that network access is to be given to the user device, receive, from the wireless communications server, a request for a temporary Internet Protocol ("IP") address to be assigned to the user device; assign the temporary IP address to the user device; and provide the user device with wireless access to the communications network.

According to some embodiments, the first identifier associated with the user device might comprise a media access control ("MAC") address associated with the user device. In some cases, the login user interface might comprise one of a login webpage or a login web form, and/or the like, which prompts a user of the user device for the unique identifier. In some instances, the unique identifier might comprise a working telephone number ("WTN") associated with the user device.

In yet another aspect, a system might comprise a user device, a customer gateway device, a network gateway device, a wireless communications server, and an authentication server. The user device might be unassociated with a customer who is associated with the customer gateway device. The user device might comprise at least one first processor and a first non-transitory computer readable medium in communication with the at least one first processor. The first non-transitory computer readable medium might have stored thereon computer software comprising a first set of instructions that, when executed by the at least one first processor, causes the user device to send a first request for wireless access to a communications network. The customer gateway device might comprise at least one second processor and a second non-transitory computer readable medium in communication with the at least one second processor. The second non-transitory computer readable medium might have stored thereon computer software comprising a second set of instructions that, when executed by the at least one second processor, causes the customer gateway device to forward the first request to the network gateway device. The network gateway device might comprise at least one third processor and a third non-transitory computer readable medium in communication with the at least one third processor. The third non-transitory computer readable medium might have stored thereon computer software comprising a third set of instructions that, when executed by the at least one third processor, causes the network gateway device to: receive, from the user device via the customer gateway device, the first request for wireless access to the communications network; determine an identity of the user device; and, based on a determination that the user device is unassociated with the customer who is associated with the customer gateway device, send, to a wireless communications server, a second request for wireless access to the communications network, the second request for network access comprising a first identifier associated with the user device.

The wireless communications server might comprise at least one fourth processor and a fourth non-transitory computer readable medium in communication with the at least one fourth processor. The fourth non-transitory computer readable medium might have stored thereon computer software comprising a fourth set of instructions that, when executed by the at least one fourth processor, causes the wireless communications server to: receive the second request for wireless access to the communications network; and, in response to receiving the second request, send a login user interface to the user device via the network gateway device, the login user interface comprising a prompt for a unique identifier, via the network gateway device. The authentication server might comprise at least one fifth processor and a fifth non-transitory computer readable medium in communication with the at least one fifth processor. The fifth non-transitory computer readable medium might have stored thereon computer software comprising a fifth set of instructions that, when executed by the at least one fifth processor, causes the authentication server to perform one or more functions.

The second set of instructions, when executed by the at least one second processor, might further cause the user device to: receive the login user interface; display the login user interface; receive a first unique identifier from the user; and send the first unique identifier to the authentication server via the network gateway device and the wireless communications server. The fifth set of instructions, when executed by the at least one fifth processor, might cause the authentication server to: receive the first unique identifier; determine whether the user device is authorized to wirelessly access the communications network, based on the received first unique identifier; and based on a determination that the user device is authorized to wirelessly access the communications network, send an indication to the wireless communications server that the user device is authorized to wirelessly access the communications network.

The fourth set of instructions, when executed by the at least one fourth processor, might further cause the wireless communications server to: receive the indication that the user device is authorized to wirelessly access the communications network; and, in response to receiving the indication, send a request for a temporary Internet Protocol ("IP") address to the network gateway device. The third set of instructions, when executed by the at least one third processor, might further cause the network gateway device to: receive the request for the temporary IP address; in response to receiving the request for the temporary IP address, generate the temporary IP address; assign the temporary IP address to the user device; and provide the user device with wireless access to the communications network.

In some embodiments, the wireless communications server might comprise a WiFi Community JavaScript ("JS") server. According to some embodiments, the authentication server might comprise a remote authentication dial-in user service ("RADIUS") protocol server, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-8 illustrate some of the features of the method, system, and apparatus for implementing wireless communications service, and, in particular embodiments, to methods, systems, apparatus, and computer software for implementing community wireless communications service, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a system 100 for implementing community wireless communications service, in accordance with various embodiments. In the embodiment of FIG. 1, system 100 might comprise one or more user devices 105, each of which might include, without limitation, a tablet computer 105*a*, a smart phone 105*b*, a mobile phone 105*c*, a portable gaming device 105*d*, a laptop computer 105*e*, or any suitable user device. System 100 might further comprise a customer gateway device 110 and (optionally) a wireless access point ("WAP") 115. The customer gateway device 110 or the WAP 115 might include, but is not limited to, a modem, a network interface device ("NID"), a residential gateway ("RG") device, a business gateway ("BG") device, a virtual gateway ("vG") device, and/or the like. As shown in FIG. 1, the user device(s) 105 is communicatively coupled to one or both of the customer gateway device 110 or the WAP 115 via a wireless connection, as denoted by the lightning bolt symbols. System 100 might further comprise a network gateway device 120, which communicatively couples to the customer gateway device 110 either directly, or indirectly via one or more intermediary devices, nodes, switches, servers, etc., including, but not limited to a digital subscriber line access multiplexer ("DSLAM") 125, a broadband remote access server ("B-RAS") 130, and/or the like. In FIG. 1, the WAP 115, the DSLAM 125, and the B-RAS 130 are shown in dash-long dash lines to denote that these are optional (or at least unclaimed) components of system 100.

System 100 might further comprise a wireless communications server 135 and an authentication server 140. In some embodiments, the network gateway device 120 might include, but is not limited to, a WiFi gateway, or the like. In some instances, the wireless communications server 135 might include, without limitation, a WiFi Community JavaScript ("JS") server and/or the like. According to some embodiments, the authentication server might include, but is not limited to, a remote authentication dial-in user service ("RADIUS") protocol server, and/or the like. In some cases, the wireless communications server 135 might communicate with the authentication server using one of a RADIUS protocol, an application programming interface ("API"), and/or the like. System 100 might further comprise network 145, which might include, without limitation, one of a fiber network, an Ethernet network, a Token-Ring™ network, a wide-area network ("WAN"), a wireless wide area network ("WWAN"), a virtual private network ("VPN"), the Internet, an intranet, an extranet, a public switched telephone network ("PSTN"), an infra-red network, a wireless network operating under any of the IEEE 802.11 suite of protocols, the Bluetooth™ protocol known in the art, and/or any other wireless protocol, and/or any combination of these and/or other networks.

System 100 might further comprise database 150, which might include, without limitation, a MongoDB or some other persistent data store, and the like. The database 150 might be in communication (either directly or indirectly (i.e., via intermediary devices)) with one or both of the network gateway device 120 or the wireless communications server 135.

In operation, a user device 105 might request (wireless) access to the network 145. In response to receiving the request via the customer gateway device 110 (and any intermediary devices, nodes, switches, servers, etc.), the network gateway device 120 might determine whether the user device 105 is known (e.g., whether the user device 105 is already associated with the customer gateway device 110 or the network service provider, in some cases, via an access control list ("ACL") lookup or the like). If the user device 105 is determined to be unassociated with the customer gateway device 110 (or otherwise not known), the network gateway device 120 might send a second request (which might include an identifier associated with the user device, including, but not limited to, a media access control ("MAC") address associated with the user device) to the wireless communications server 135.

In embodiments in which a cache of user identification on a database (e.g., a MongoDB or some other persistent data store, and the like) to provide login-free access for the user of the user device after having previously gained access for the first time through login authentication (such as described above with respect to FIGS. 5 and 6), the wireless communications server 135 might query a database or data store 150 to determine whether or not the user device 105 has previously been granted access to the network 145. If so, the wireless communications server 135 might request that the network gateway device 120 assign a temporary Internet Protocol ("IP") address (which might include, without limitation, a care-of address or the like) to the user device 105, and might (optionally) store identification (e.g., the MAC address, a working telephone number ("WTN"), or other identifier associated with the user device 105) in the database 150, with an indication that the user device 105 has again been given access. Although such storing of identification is redundant as the user device 105 is already in the database, this might allow for tracking of how often and when the user device 105 requests access, or the like. Meanwhile, the network gateway device 120 might send an acknowledgement of the request for temporary IP address back to the wireless communications server 135, while assigning the temporary IP address to the user device 105 and providing the user device 105 access to the network 145. In some instances, the wireless communications server 135 might generate and send a welcome user interface ("UI") to the user device 105. Upon being provided network access and/or receiving the welcome UI, the user device 105 can proceed to exchange data other devices over the network 145, via the customer gateway device 110 and the network gateway device 120 (and any intermediary devices).

In the case that it is determined that the user device 105 has not previously been granted access to the network 145 (either previously denied access or the current access request being a first access request) or in the embodiments that the user of the user device 105 is required to login each time that access to the network 145 is requested through the customer gateway device 110 that is not associated with the user, the wireless communications device 135 might generate and send a login UI to the user device 105 (via the network gateway 120 and via the customer gateway 110). The user or the user device 105 might send a unique identifier (including, but not limited to, a working telephone number ("WTN") or the like that is associated with the user device 105). Upon receiving the unique identifier, the wireless communications server 135 might send an access request to the authentication server 140, which might determine whether the user device 105 or the user associated therewith is permitted to access the network 145, e.g., if the user is a customer or subscriber of the network service provider, albeit typically through (or associated with) a different customer gateway device). If so, the authentication server 140 might return an access accepted notification. In response to receiving the access accepted notification, the wireless communications server 135 might request that the network gateway device 120 assign a temporary Internet Protocol ("IP") address (which might include, without limitation, a care-of address or the like) to the user device 105, and might (optionally, in the embodiments where the database is used as described above) store identification (e.g., the MAC address, the WTN, or other identifier associated with the user device 105) in the database 150, with an indication that the user device 105 has now been given access. Meanwhile, the network gateway device 120 might send an acknowledgement of the request for temporary IP address back to the wireless communications server 135, while assigning the temporary IP address to the user device 105 and providing the user device 105 access to the network 145. In some instances, the wireless communications server 135 might generate and send a welcome UI to the user device 105. Upon being provided network access and/or receiving the welcome UI, the user device 105 can proceed to exchange data other devices over the network 145, via the customer gateway device 110 and the network gateway device 120 (and any intermediary devices).

In the case that the authentication server determines that the user device 105 or the user associated therewith is not permitted to access the network 145, the authentication server 140 might return an access denied notification. In response to receiving the access denied notification, the wireless communications server 135 might notify the network gateway device 120 that access has been denied to the user device 105, and might (optionally, in the embodiments where the database is used as described above) store identification (e.g., the MAC address, the WTN, or other identifier associated with the user device 105) in the database 150, with an indication that the user device 105 has been denied access. Meanwhile, the network gateway device 120 might send an acknowledgement of the notice back to the wireless communications server 135, while blocking network access to the user device 105. In some instances, the wireless communications server 135 might generate and send an access denied UI to the user device 105.

These and other functionalities associated with the method and system for implementing community wireless communications service are described in greater detail above with respect to FIGS. 3-6.

In some embodiments, system 100 might further comprise data analytics server 155 (shown in dash-long dash lines to indicate that this component is optional), which might communicatively couple with database 150 (either indirectly via intermediary devices or directly). The data analytics server 155 might analyze how often the user device 105 (or the user associated with the user device 105, not limited to using one user device) might try to access network 145, using his or her associated customer gateway device, using customer gateway device 110 (i.e., someone else's customer gateway device), success rates for accessing network access as described above, denial rates for accessing network access as described above, dates and times for each attempted or requested access, and/or the like. In some cases, websites, data content, source identifiers, location of user at the time of requested access or actual access, etc. might also be tracked by network gateway device 120 and stored in database 150 for access requests by the user (either through his or her or customer gateway device or someone else's), and the data analytics server 155 might analyze such tracked data, perhaps in conjunction with advertisement ("ad") generator servers or ad service provider servers, or the like, to provide targeted ads based on any combination of the types of websites that the user visits, the apps downloaded by the user, the types of media content or data content downloaded (or uploaded) by the user, the location of the user, the dates/times of network access activity of the user, and/or the like.

Figure 2:
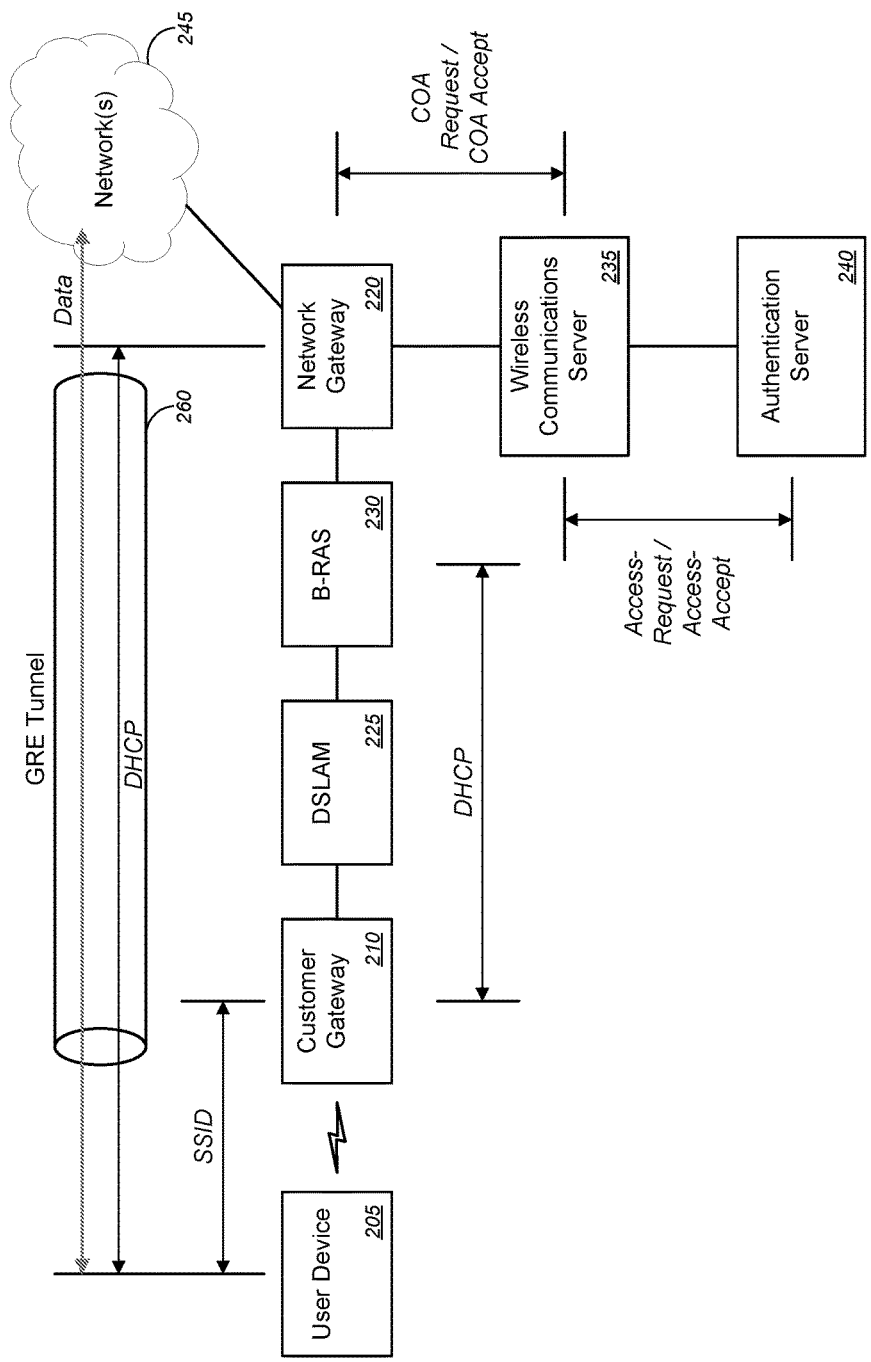
FIG. 2 is a schematic diagram illustrating another system for implementing community wireless communications service, in accordance with various embodiments.

FIG. 2 is a schematic diagram illustrating another system 200 for implementing community wireless communications service, in accordance with various embodiments. In the embodiment of FIG. 2, system 200 might comprise one or more user devices 205, each of which might include, without limitation, a tablet computer, a smart phone, a mobile phone, a portable gaming device, a laptop computer, or any suitable user device, as described above with respect to FIG. 1. System 200 might further comprise a customer gateway device 210, which might include, but is not limited to, a modem, a network interface device ("NID"), a residential gateway ("RG") device, a business gateway ("BG") device, a virtual gateway ("vG") device, and/or the like. As shown in FIG. 2, the user device(s) 105 is communicatively coupled to the customer gateway device 210 via a wireless connection, as denoted by the lightning bolt symbol. System 200 might further comprise a network gateway device 220, which communicatively couples to the customer gateway device 210, via one or more intermediary devices, nodes, switches, servers, etc., including, but not limited to a digital subscriber line access multiplexer ("DSLAM") 225, a broadband remote access server ("B-RAS") 230, and/or the like.

System 200 might further comprise a wireless communications server 235 and an authentication server 240. In some embodiments, the network gateway device 220 might include, but is not limited to, a WiFi gateway, or the like. In some instances, the wireless communications server 235 might include, without limitation, a WiFi Community JavaScript ("JS") server and/or the like. According to some embodiments, the authentication server might include, but is not limited to, a remote authentication dial-in user service ("RADIUS") protocol server, and/or the like. In some cases, the wireless communications server 235 might communicate with the authentication server using one of a RADIUS protocol, an application programming interface ("API"), and/or the like. System 200 might further comprise network 245, which might include, without limitation, one of a fiber network, an Ethernet network, a Token-Ring™ network, a wide-area network ("WAN"), a wireless wide area network ("WWAN"), a virtual private network ("VPN"), the Internet, an intranet, an extranet, a public switched telephone network ("PSTN"), an infra-red network, a wireless network operating under any of the IEEE 802.11 suite of protocols, the Bluetooth™ protocol known in the art, and/or any other wireless protocol, and/or any combination of these and/or other networks.

According to some embodiments, the customer gateway device 210 might receive a global IP assignment via a DHCP exchange with associated B-RAS 230. In some cases, a carrier-defined service set identifier ("SSID") may be configured in the customer gateway device 210. As shown in FIG. 2, a communications tunnel 260 (e.g., a GRE tunnel or the like) may be established between the network gateway device 220 and the customer gateway device 210 using a tunneling protocol (e.g., a GRE protocol or the like), and communication between the network gateway device 220 and the user device 205 is through the communication tunnel via the customer gateway device 210. In some cases, DHCP may be used to establish the communications tunnel 260.

In operation, a user device 205 might request (wireless) access to the network 245. In response to receiving the request via the customer gateway device 210 (and any intermediary devices, nodes, switches, servers, etc.), the network gateway device 220 might determine whether the user device 205 is known (e.g., whether the user device 205 is already associated with the customer gateway device 210 or the network service provider, in some cases, via an access control list ("ACL") lookup or the like). If the user device 205 is determined to be unassociated with the customer gateway device 210 (or otherwise not known), the network gateway device 220 might send a second request (which might include an identifier associated with the user device, including, but not limited to, a media access control ("MAC") address associated with the user device) to the wireless communications server 235.

The wireless communications device 235 might generate and send a login UI to the user device 205 (via the network gateway 220 and via the customer gateway 210). The user or the user device 205 might send a unique identifier (including, but not limited to, a working telephone number ("WTN") or the like that is associated with the user device 205). Upon receiving the unique identifier, the wireless communications server 235 might send an access request to the authentication server 240, which might determine whether the user device 205 or the user associated therewith is permitted to access the network 245, e.g., if the user is a customer or subscriber of the network service provider, albeit typically through (or associated with) a different customer gateway device). If so, the authentication server 240 might return an access accepted notification. In response to receiving the access accepted notification, the wireless communications server 235 might request that the network gateway device 220 assign a temporary Internet Protocol ("IP") address (which might include, without limitation, a care-of address or the like) to the user device 205. Meanwhile, the network gateway device 220 might send an acknowledgement of the request for temporary IP address back to the wireless communications server 235, while assigning the temporary IP address to the user device 205 and providing the user device 205 access to the network 245. In some instances, the wireless communications server 235 might generate and send a welcome UI to the user device 205. Upon being provided network access and/or receiving the welcome UI, the user device 205 can proceed to exchange data other devices over the network 245, via the customer gateway device 210 and the network gateway device 220 (and any intermediary devices), as shown by the arrow through the GRE tunnel 260, denoted "Data."

These and other functionalities associated with the method and system for implementing community wireless communications service are described in greater detail above with respect to FIGS. 3-4.

In the embodiments of FIG. 2, user device 205, customer gateway device 210, network gateway device 220, DSLAM 225, B-RAS 230, wireless communications server 235, authentication server 240, and network 245 might otherwise correspond to user device 105, customer gateway device 110, network gateway device 120, DSLAM 125, B-RAS 130, wireless communications server 135, authentication server 140, and network 145, respectively, of the embodiments of FIG. 1, and like descriptions of these components of FIG. 1 apply similarly to the corresponding components of FIG. 2.

FIGS. 3A-4B are directed to a method 300 for implementing community wireless communications service that requires login by the user of the user device each time that access to the communications network (e.g., the Internet or other network) is requested through an (wireless) access point or customer gateway that is not associated with the user, while FIGS. 5A-6C are directed to an alternative method for implementing community wireless communications service that uses a cache of user identification on a database (e.g., a MongoDB or some other persistent data store, and the like) to provide login-free access for the user of the user device after having previously gained access for the first time through login authentication.

Figure 3A:
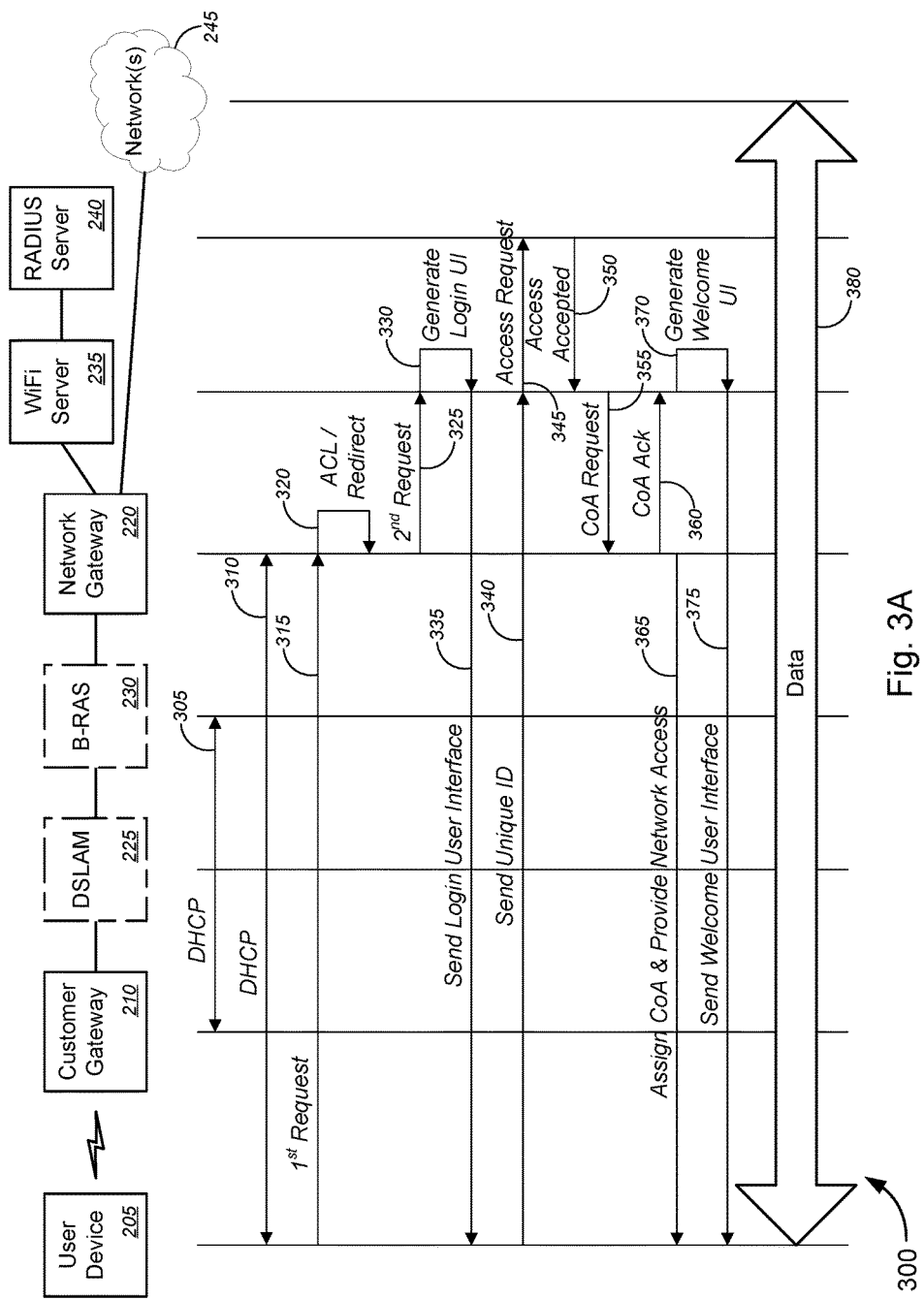
FIGS. 3A and 3B are sequence diagrams illustrating a method for implementing community wireless communications service, in accordance with various embodiments.
Figure 3B:
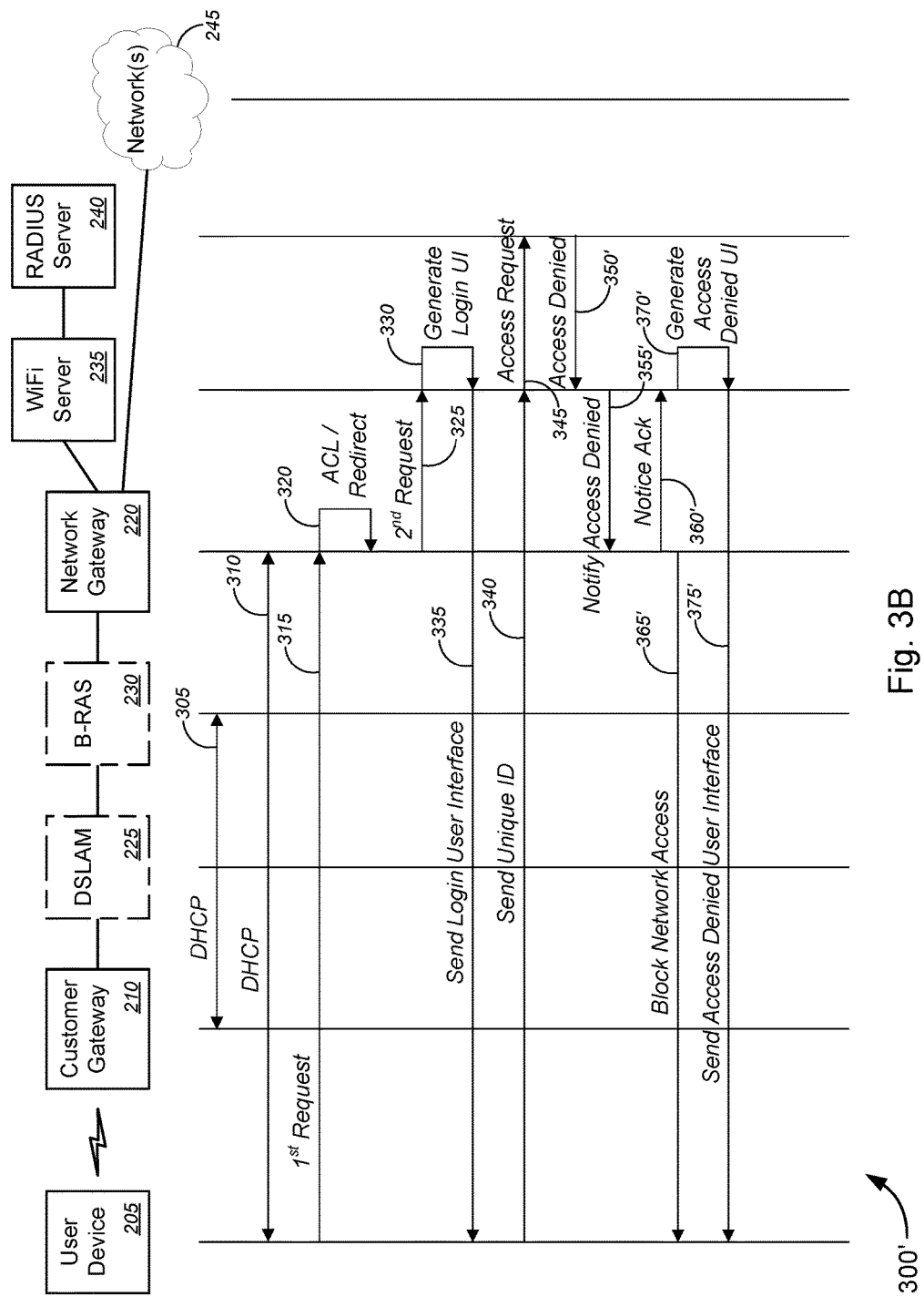

FIGS. 3A and 3B (collectively, "FIG. 3") are sequence diagrams illustrating methods 300 and 300' for implementing community wireless communications service, in accordance with various embodiments. FIG. 3A depicts method 300, in which (wireless) network access is granted to the user device 205, while FIG. 3B depicts method 300', in which (wireless) network access is denied to the user device 205.

In FIG. 3, user device 205, customer gateway device 210, network gateway device 220, DSLAM 225, B-RAS 230, wireless communications server 235, authentication server 240, and network 245 correspond to user devices 105 and 205, customer gateway devices 110 and 210, network gateway devices 120 and 220, DSLAMs 125 and 225, B-RASs 130 and 230, wireless communications servers 135 and 235, authentication servers 140 and 240, and networks 145 and 245, respectively, of the embodiments of FIGS. 1 and 2, and like descriptions of these components of FIGS. 1 and 2 apply similarly to the corresponding components of FIG. 3.

With reference to FIG. 3A, method 300 might, at process 305, comprise the customer gateway device 210 receiving a global IP assignment via a DHCP exchange with associated B-RAS 230. In some cases, a carrier-defined service set identifier ("SSID") may be configured in the customer gateway device 210 (not shown). At process 310, a communications tunnel (e.g., a GRE tunnel or the like) may be established between the network gateway device 220 and the customer gateway device 210 using a tunneling protocol (e.g., a GRE protocol or the like), and communication between the network gateway device 220 and the user device 205 is through the communication tunnel via the customer gateway device 210. In some cases, DHCP may be used to establish the communications tunnel.

In operation, at process 315, the user device 205 might request (wireless) access to a network 245. In response to receiving the request via the customer gateway device 210 (and any intermediary devices, nodes, switches, servers, etc., such as DSLAM 225 and B-RAS 230 or the like), the network gateway device 220 might determine whether the user device 205 is known (e.g., whether the user device 205 is already associated with the customer gateway device 210 or the network service provider, in some cases, via an access control list ("ACL") lookup or the like). If the user device 205 is determined to be unassociated with the customer gateway device 210 (or otherwise not known) (at process 320), the network gateway device 220 might send a second request (which might include an identifier associated with the user device, including, but not limited to, a media access control ("MAC") address associated with the user device) to the wireless communications server 235 (at process 325).

The wireless communications device 235 might generate (at process 330) and might send (at process 335) a login user interface ("UI") to the user device 205 (via the network gateway 220 and via the customer gateway 210). The user or the user device 205 might, at process 340, send a unique identifier (including, but not limited to, a working telephone number ("WTN") or the like that is associated with the user device 205). Upon receiving the unique identifier, the wireless communications server 235 might send an access request to the authentication server 240 (at process 345), which might determine whether the user device 205 or the user associated therewith is permitted to access the network 245, e.g., if the user is a customer or subscriber of the network service provider, albeit typically through (or associated with) a different customer gateway device). If so, the authentication server 240 might return an access accepted notification (at process 350).

In response to receiving the access accepted notification, the wireless communications server 235 might request that the network gateway device 220 assign a temporary Internet Protocol ("IP") address (which might include, without limitation, a care-of address ("CoA") or the like) to the user device 205 (at process 355). Meanwhile, the network gateway device 220 might send an acknowledgement of the request for temporary IP address back to the wireless communications server 235 (at process 360), while assigning the temporary IP address to the user device 205 and providing the user device 205 access to the network 210 (at process 365). In some instances, the wireless communications server 235 might generate (at process 370) and might send (at process 375) a welcome UI to the user device 205. Upon being provided network access and/or receiving the welcome UI, the user device 205 can proceed to exchange data other devices over the network 210, via the customer gateway device 225 and the network gateway device 230 (and any intermediary devices) (at process 380).

Turning to FIG. 3B, processes 305 through 345 of method 300 of FIG. 3A might be similar, if not identical, to processes 305 through 345 of method 300' of FIG. 3B, and the descriptions of these processes of method 300 similarly apply to the corresponding processes of method 300'. In the case that the authentication server 240 determines that the user device 205 or the user associated therewith is not permitted to access the network 245, the authentication server 240 might return an access denied notification (at process 350'). In response to receiving the access denied notification, the wireless communications server 235 might notify the network gateway device 220 that access has been denied to the user device 205 (at process 355'). Meanwhile, the network gateway device 220 might send an acknowledgement of the notice back to the wireless communications server 235 (at process 360'), while blocking network access to the user device 205 (at process 365'). In some instances, the wireless communications server 235 might generate (at process 370') and might send (at process 375') an access denied UI to the user device 205.

Figure 4A:
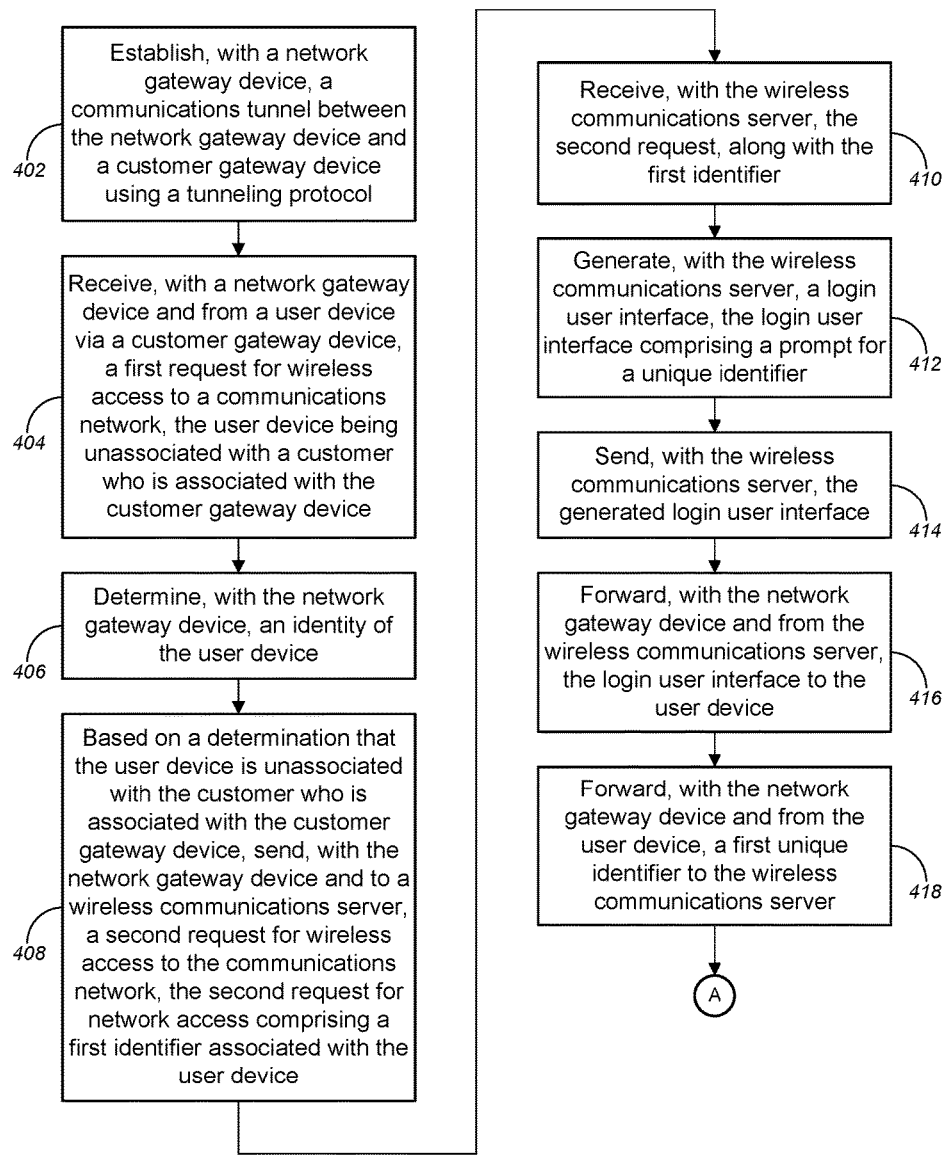
FIGS. 4A and 4B are flow diagrams illustrating a method for implementing community wireless communications service, in accordance with various embodiments.
Figure 4B:
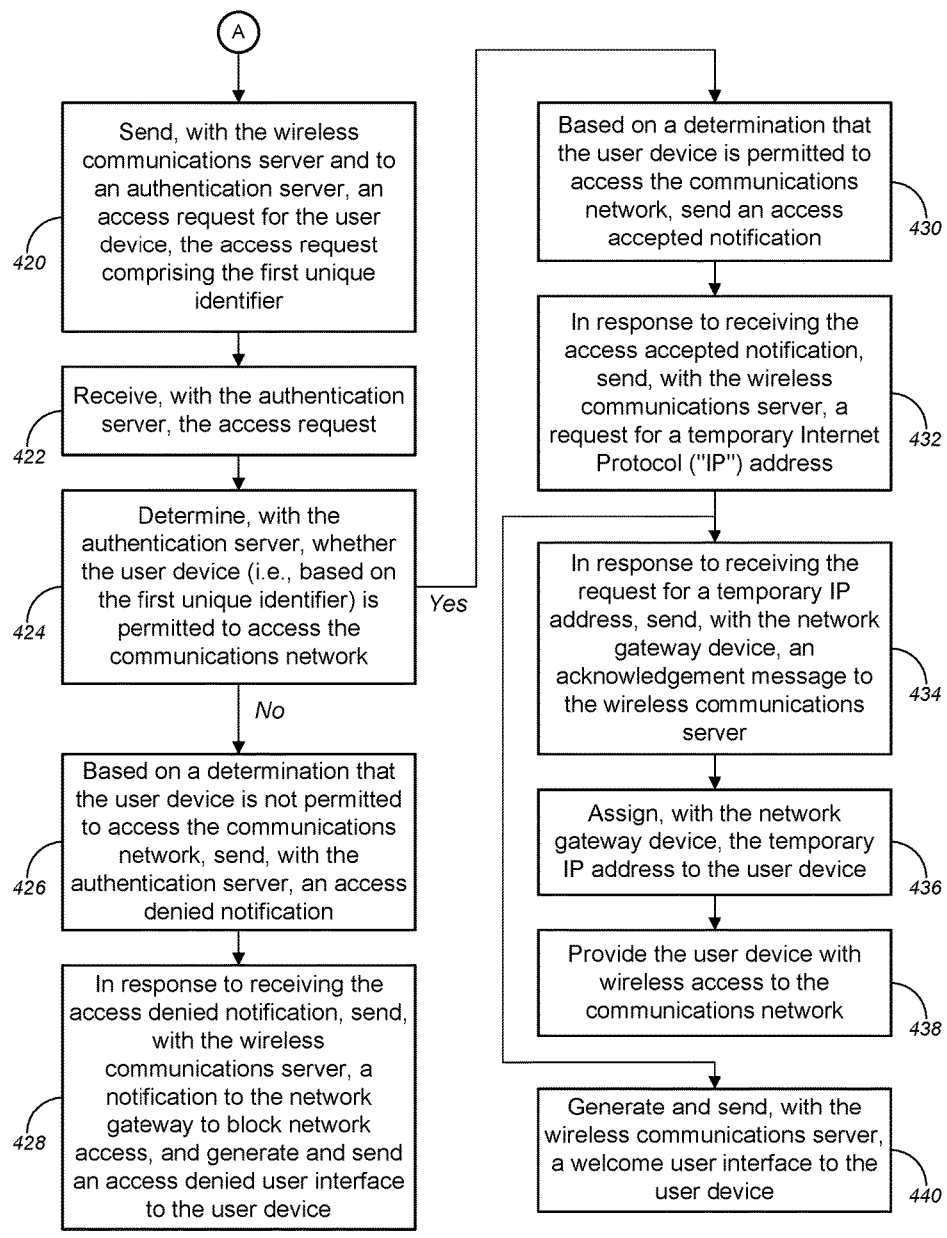

FIGS. 4A and 4B (collectively, "FIG. 4") are flow diagrams illustrating a method 400 for implementing community wireless communications service, in accordance with various embodiments. Method 400 in FIG. 4A continues onto FIG. 4B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems 100 and 200 of FIGS. 1 and 2, respectively (or components thereof), such methods may also be implemented using any suitable hardware (or software) implementation. Similarly, while each of the systems 100 and 200 of FIGS. 1 and 2, respectively (or components thereof), can operate according to the method 400 illustrated by FIG. 4 (e.g., by executing instructions embodied on a computer readable medium), the systems 100 and 200 of FIGS. 1 and 2 can each also operate according to other modes of operation and/or perform other suitable procedures.

With reference to FIG. 4A, method 400, at block 402, might comprise establishing, with a network gateway device (e.g., network gateway device 120 or 220 of FIGS. 1 and 2, respectively, or the like), a communications tunnel between the network gateway device and the customer gateway device using a tunneling protocol. In such cases, communication between the network gateway device and a user device (e.g., user device 105 or 205 of FIGS. 1 and 2, respectively, or the like) is through the communication tunnel via a customer gateway device (e.g., customer gateway device 110 or 210 of FIGS. 1 and 2, respectively, or the like). In some instances, the tunneling protocol might include generic routing encapsulation ("GRE") protocol, and the communications tunnel might include a GRE tunnel, as shown and described above, for example, in the embodiment of FIG. 2. At block 404, method 400 might comprise receiving, with the network gateway device and from the user device via the customer gateway device (and in some cases via a wireless access point (e.g., wireless access point 115 of FIG. 1 or the like)), a first request for wireless access to a communications network, the user device being unassociated with a customer who is associated with the customer gateway device. In other words, the user device requests network access (e.g., public Internet access) through a gateway and/or access point that is associated with someone else, who might be a friend, a family member, a stranger or other unknown/unaffiliated person, an unaffiliated company, etc.

Method 400 might further comprise determining, with the network gateway device, an identity of the user device (block 406) and, based on a determination that the user device is unassociated with the customer who is associated with the customer gateway device, sending, with the network gateway device and to a wireless communications server (e.g., wireless communications server 135 or 235 of FIGS. 1 and 2, respectively, or the like), a second request for wireless access to the communications network, the second request for network access comprising a first identifier associated with the user device (block 408). In some instances, the first identifier associated with the user device might include, without limitation, a media access control ("MAC") address and/or some other identifier associated with the user device. According to some embodiments, determining, with the network gateway device, the identity of the user device and sending, with the network gateway device and to the wireless communications server, the second request for wireless access to the communications network, based on the determination that the user device is unassociated with the customer who is associated with the customer gateway device, might comprise: obtaining, with the network gateway device, the first identifier from the user device; comparing, with the network gateway device, the first identifier with identifiers listed in an access control list ("ACL"); determining, with the network gateway device, whether the user device has permission to wirelessly access the communications network based on the comparison of the first identifier with identifiers listed in the ACL; and based on a determination that the user device does not have permission to wirelessly access the communications network, initiating, with the network gateway device, a hypertext transfer protocol ("HTTP") redirect operation, wherein the HTTP redirect operation comprises sending, with the network gateway device, the second request to the wireless communications server.

Method 400 might, at block 410, comprise receiving, with the wireless communications server, the second request, along with the first identifier. The method 400 might further comprise generating, with the wireless communications server, a login user interface ("UI") (block 412) and sending, with the wireless communications server, the generated login UI (block 414). In some embodiments, the login UI might include, but is not limited to, one of a login webpage, a login web form, a software application ("app") form, and/or the like, each of which prompts a user of the user device for a unique identifier (e.g., a unique identifier associated with either the user or the user device, or both). At block 416, method 400 might comprise forwarding, with the network gateway device and from the wireless communications server, the login UI to the user device. In some cases, forwarding the login UI might comprise receiving, with the network gateway device, the login UI from the wireless communications server and sending, with the network gateway device, the login UI to the user device via the customer gateway device (and any intermediary devices, nodes, servers, etc.).

The user might subsequently input the requested unique identifier or the user device might automatically input the requested unique identifier, and the user device might send the requested unique identifier (herein referred to as "first unique identifier") to the wireless communications server via the network gateway device. Method 400, at block 418, might comprise forwarding, with the network gateway device and from the user device, the first unique identifier to the wireless communications server, the first unique identifier being associated with the user device and being different from the first identifier. The first unique identifier, in some embodiments, might include, but is not limited to, a working telephone number ("WTN") or some other suitable identifier associated with the user device, and/or the like. In some instances, forwarding, with the network gateway device and from the user device, the first unique identifier to the wireless communications server might comprise receiving, with the network gateway device, the first unique identifier from the user device via the customer gateway device and sending, with the network gateway device, the first unique identifier to the wireless communications server. Method 400 then continues onto the process at block 420 in FIG. 4B, following the marker denoted, "A."

Turning to FIG. 4B, at block 420, method 400 might comprise sending, with the wireless communications server and to an authentication server, an access request for the user device. The access request might include, without limitation, the first unique identifier, in some cases, along with any other suitable identifier associated with the user and/or the user device. According to some embodiments, the wireless communications server might comprise a WiFi Community JavaScript ("JS") server, and the authentication server might comprise a remote authentication dial-in user service ("RADIUS") protocol server, where the WiFi Community JS server communicates with the RADIUS protocol server using RADIUS protocol. Alternatively, the wireless communications server might comprise a WiFi Community JavaScript ("JS") server, and the authentication server comprises a RADIUS server, where the WiFi Community JS server communicates with the RADIUS server using an application programming interface ("API"). Method 400 might further comprise receiving, with the authentication server, the access request (block 422) and determining, with the authentication server, whether the user device is permitted to access the communications network (block 424). In some embodiments, such determination might be made based on the first unique identifier (e.g., WTN or the like). Alternatively, or additionally, such determination might be made based on a further determination as to whether the user is a customer or subscriber of the network service provider associated with the network gateway device (and/or the like wireless communications server, and/or the authentication server, and the like), albeit typically through (or associated with) a different customer gateway device (e.g., a customer gateway device that is located at the customer premises associated with the user of the user device, the user's customer gateway device being geographically separate (i.e., such that the user device is outside the wireless transmission/reception range of the user's customer gateway device) from the location of the current customer gateway device through which the user device (or the user) is requesting network access). If it is determined that the user device is not permitted to access the network, method 400 proceeds to block 426. If it is determined that the user device is permitted to access the network, however, method 400 proceeds to block 430.

Based on a determination that the user device is not permitted to access the communications network, method 400 might further comprise, at block 426, sending, with the authentication server, an access denied notification. At block 428, method 400 might comprise, in response to receiving the access denied notification, sending, with the wireless communications server, a notification to the network gateway device to block network access by the user device, and generating and sending an access denied UI to the user device. In some cases (not shown), the access denied UI might include, without limitation, options for the user to input different first unique identifier and to try authentication again, which might cause the method to return to block 412 or 418.

Based on a determination that the user device is permitted to access the communications network, method 400 might comprise, at block 430, sending an access accepted notification. At block 432, method 400 might comprise, in response to receiving the access accepted notification, sending, with the wireless communications server, a request for a temporary Internet Protocol ("IP") address (which might, in some cases, be a care-of address or the like). Method 400 might further comprise, in response to receiving the request for temporary IP address, sending, with the network gateway device, an acknowledgement message to the wireless communications server (block 434), assigning, with the network gateway device, the temporary IP address to the user device (which, in some instances, might be performed using dynamic host configuration protocol ("DHCP") or the like) (block 436), and providing the user device with wireless access to the communications network (block 438). Method 400 might further comprise, concurrent with or parallel with the processes at blocks 434-438, generating and sending, with the wireless communications server, a welcome user interface to the user device (block 440). Upon being provided network access and/or receiving the welcome UI, the user device can proceed to exchange data other devices over the communications network, via the customer gateway device and the network gateway device (and any intermediary devices).

Figure 5A:
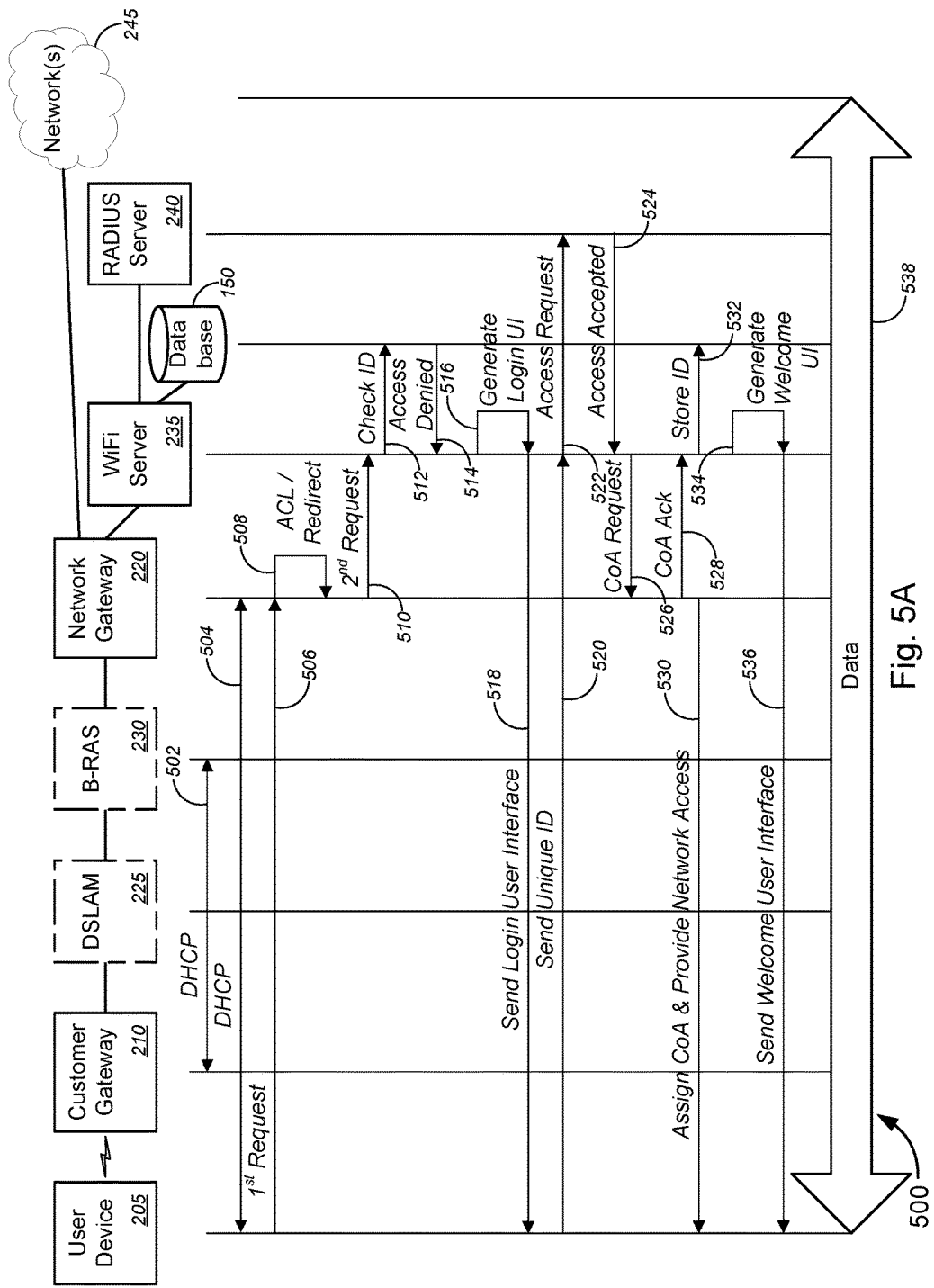
FIGS. 5A-5C are sequence diagrams illustrating another method for implementing community wireless communications service, in accordance with various embodiments.
Figure 5B:
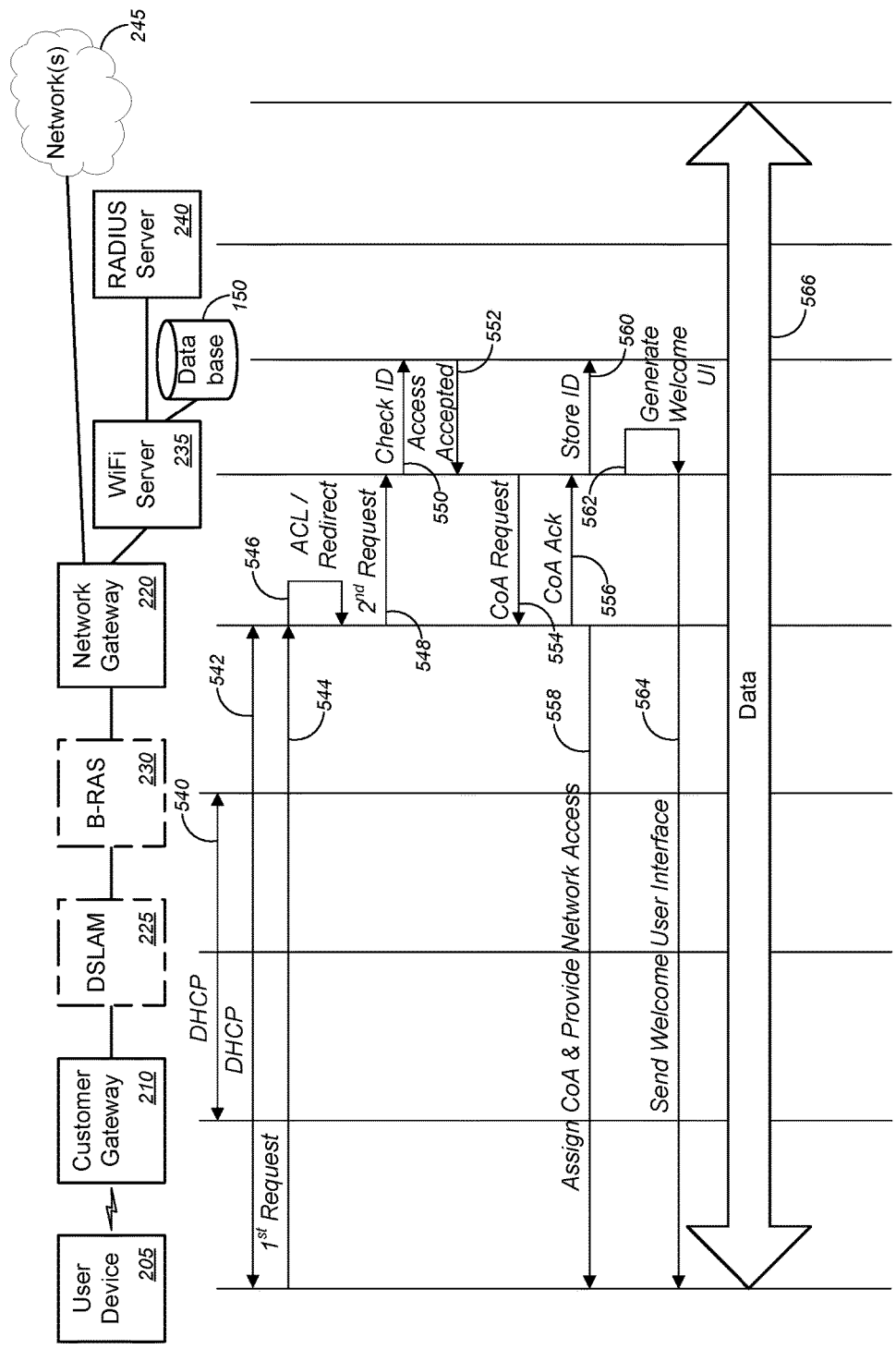
Figure 5C:
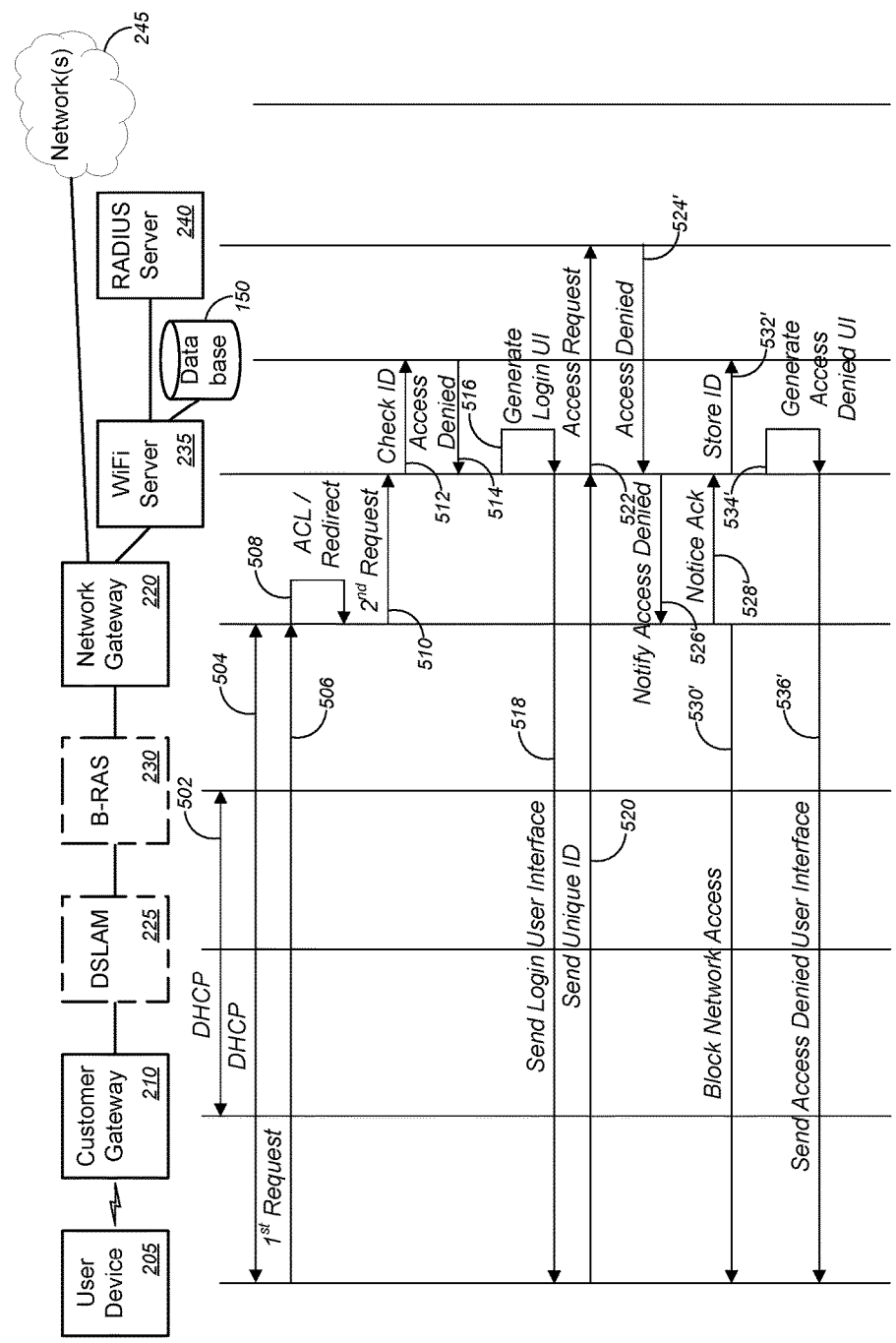

FIGS. 5A-5C (collectively, "FIG. 5") are sequence diagrams illustrating alternative methods 500 and 500' for implementing community wireless communications service, in accordance with various embodiments. FIG. 5A depicts method 500, in which (wireless) network access is granted for the first time to the user device 205, while FIG. 5B depicts method 500, in which (wireless) network access is granted in response to subsequent requests for network access from the user device 205, and FIG. 5C depicts method 500', in which (wireless) network access is denied to the user device 205.

In FIG. 5, user device 205, customer gateway device 210, network gateway device 220, DSLAM 225, B-RAS 230, wireless communications server 235, authentication server 240, database 150, and network 245 correspond to user devices 105 and 205, customer gateway devices 110 and 210, network gateway devices 120 and 220, DSLAMs 125 and 225, B-RASs 130 and 230, wireless communications servers 135 and 235, authentication servers 140 and 240, database 150, and networks 145 and 245, respectively, of the embodiments of FIGS. 1 and 2, and like descriptions of these components of FIGS. 1 and 2 apply similarly to the corresponding components of FIG. 5.

With reference to FIG. 5A, method 500 might, at process 502, comprise the customer gateway device 210 receiving a global IP assignment via a DHCP exchange with associated B-RAS 230. In some cases, a carrier-defined service set identifier ("SSID") may be configured in the customer gateway device 210 (not shown). At process 504, a communications tunnel (e.g., a GRE tunnel or the like) may be established between the network gateway device 220 and the customer gateway device 210 using a tunneling protocol (e.g., a GRE protocol or the like), and communication between the network gateway device 220 and the user device 205 is through the communication tunnel via the customer gateway device 210. In some cases, DHCP may be used to establish the communications tunnel.

In operation, at process 506, the user device 205 might request (wireless) access to a network 245. In response to receiving the request via the customer gateway device 210 (and any intermediary devices, nodes, switches, servers, etc., such as DSLAM 225 and B-RAS 230 or the like), the network gateway device 220 might determine whether the user device 205 is known (e.g., whether the user device 205 is already associated with the customer gateway device 210 or the network service provider, in some cases, via an access control list ("ACL") lookup or the like). If the user device 205 is determined to be unassociated with the customer gateway device 210 (or otherwise not known) (at process 508), the network gateway device 220 might send a second request (which might include an identifier associated with the user device, including, but not limited to, a media access control ("MAC") address associated with the user device) to the wireless communications server 235 (at process 510).

The wireless communications server 235 might query a database or data store 150 to determine whether or not the user device 205 has previously been granted access to the network 245 (at process 512). In the case that it is determined that the user device 205 has not previously been granted access to the network 245 (either previously denied access or the current access request being a first access request), the database 150 might return an access denied notification (at process 514), and the wireless communications device 235 might generate (at process 516) and might send (at process 518) a login user interface ("UI") to the user device 205 (via the network gateway 220 and via the customer gateway 210). The user or the user device 205 might, at process 520, send a unique identifier (including, but not limited to, a working telephone number ("WTN") or the like that is associated with the user device 205). Upon receiving the unique identifier, the wireless communications server 235 might send an access request to the authentication server 240 (at process 522), which might determine whether the user device 205 or the user associated therewith is permitted to access the network 245, e.g., if the user is a customer or subscriber of the network service provider, albeit typically through (or associated with) a different customer gateway device). If so, the authentication server 240 might return an access accepted notification (at process 524).

In response to receiving the access accepted notification, the wireless communications server 235 might request that the network gateway device 220 assign a temporary Internet Protocol ("IP") address (which might include, without limitation, a care-of address ("CoA") or the like) to the user device 205 (at process 526). Meanwhile, the network gateway device 220 might send an acknowledgement of the request for temporary IP address back to the wireless communications server 235 (at process 528), while assigning the temporary IP address to the user device 205 and providing the user device 205 access to the network 210 (at process 530). At process 532, the wireless communications server 235 might store identification (e.g., the MAC address or other identifier associated with the user device 205) in the database 150, with an indication that the user device 205 has now been given access. In some instances, the wireless communications server 235 might generate (at process 534) and might send (at process 536) a welcome UI to the user device 205. Upon being provided network access and/or receiving the welcome UI, the user device 205 can proceed to exchange data other devices over the network 210, via the customer gateway device 225 and the network gateway device 230 (and any intermediary devices) (at process 538).

Upon subsequent requests to access network 245, method 500 might be as shown in FIG. 5B. In FIG. 5B, similar to the processes in FIG. 5A, method 500 might, at process 540, comprise the customer gateway device 210 receiving a global IP assignment via a DHCP exchange with associated B-RAS 230. In some cases, a carrier-defined service set identifier ("SSID") may be configured in the customer gateway device 210 (not shown). At process 542, a communications tunnel (e.g., a GRE tunnel or the like) may be established between the network gateway device 220 and the customer gateway device 210 using a tunneling protocol (e.g., a GRE protocol or the like), and communication between the network gateway device 220 and the user device 205 is through the communication tunnel via the customer gateway device 210. In some cases, DHCP may be used to establish the communications tunnel.

In operation, at process 544, the user device 205 might request (wireless) access to a network 245. In response to receiving the request via the customer gateway device 210 (and any intermediary devices, nodes, switches, servers, etc., such as DSLAM 225 and B-RAS 230 or the like), the network gateway device 220 might determine whether the user device 205 is known (e.g., whether the user device 205 is already associated with the customer gateway device 210 or the network service provider, in some cases, via an access control list ("ACL") lookup or the like). If the user device 205 is determined to be unassociated with the customer gateway device 210 (or otherwise not known) (at process 546), the network gateway device 220 might send a second request (which might include an identifier associated with the user device, including, but not limited to, a media access control ("MAC") address associated with the user device) to the wireless communications server 235 (at process 548).

The wireless communications server 235 might query a database or data store 150 to determine whether or not the user device 205 has previously been granted access to the network 245 (at process 550). In the case that it is determined that the user device 205 has previously been granted access to the network 245, the database 150 might return an access accepted notification (at process 552), and the wireless communications device 235 might request that the network gateway device 220 assign a temporary Internet Protocol ("IP") address (which might include, without limitation, a care-of address ("CoA") or the like) to the user device 205 (at process 554). Meanwhile, the network gateway device 220 might send an acknowledgement of the request for temporary IP address back to the wireless communications server 235 (at process 556), while assigning the temporary IP address to the user device 205 and providing the user device 205 access to the network 210 (at process 558). At process 560, the wireless communications server 235 might store identification (e.g., the MAC address or other identifier associated with the user device 205) in the database 150, with an indication that the user device 205 has again been given access. Although such storing of identification is redundant as the user device 205 is already in the database 150, this might allow for tracking of how often and when the user device 205 requests access, and the like. In some instances, the wireless communications server 235 might generate (at process 562) and might send (at process 564) a welcome UI to the user device 205. Upon being provided network access and/or receiving the welcome UI, the user device 205 can proceed to exchange data other devices over the network 210, via the customer gateway device 225 and the network gateway device 230 (and any intermediary devices) (at process 566).

Turning to FIG. 5C, processes 502 through 522 of method 500 of FIG. 5A might be similar, if not identical, to processes 502 through 522 of method 500' of FIG. 5C, and the descriptions of these processes of method 500 similarly apply to the corresponding processes of method 500'. In the case that the authentication server 240 determines that the user device 205 or the user associated therewith is not permitted to access the network 245, the authentication server 240 might return an access denied notification (at process 524'). In response to receiving the access denied notification, the wireless communications server 235 might notify the network gateway device 220 that access has been denied to the user device 205 (at process 526'). Meanwhile, the network gateway device 220 might send an acknowledgement of the notice back to the wireless communications server 235 (at process 528'), while blocking network access to the user device 205 (at process 530'). At process 532', the wireless communications server 235 might store identification (e.g., the MAC address or other identifier associated with the user device 205) in the database 150, with an indication that the user device 205 has been denied access. In some instances, the wireless communications server 235 might generate (at process 534') and might send (at process 536') an access denied UI to the user device 205.

Figure 6A:
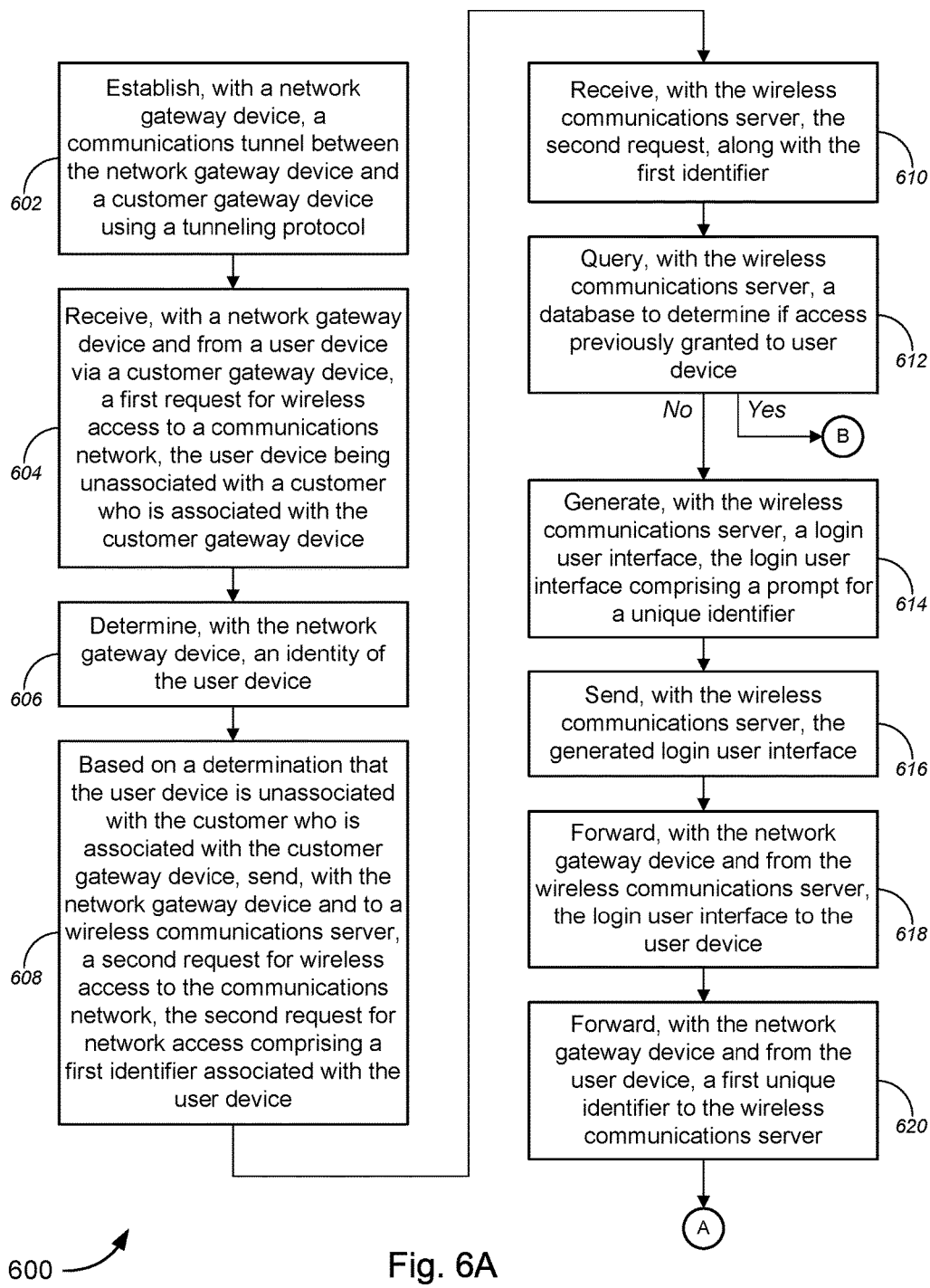
FIGS. 6A-6C are flow diagrams illustrating another method for implementing community wireless communications service, in accordance with various embodiments.
Figure 6B:
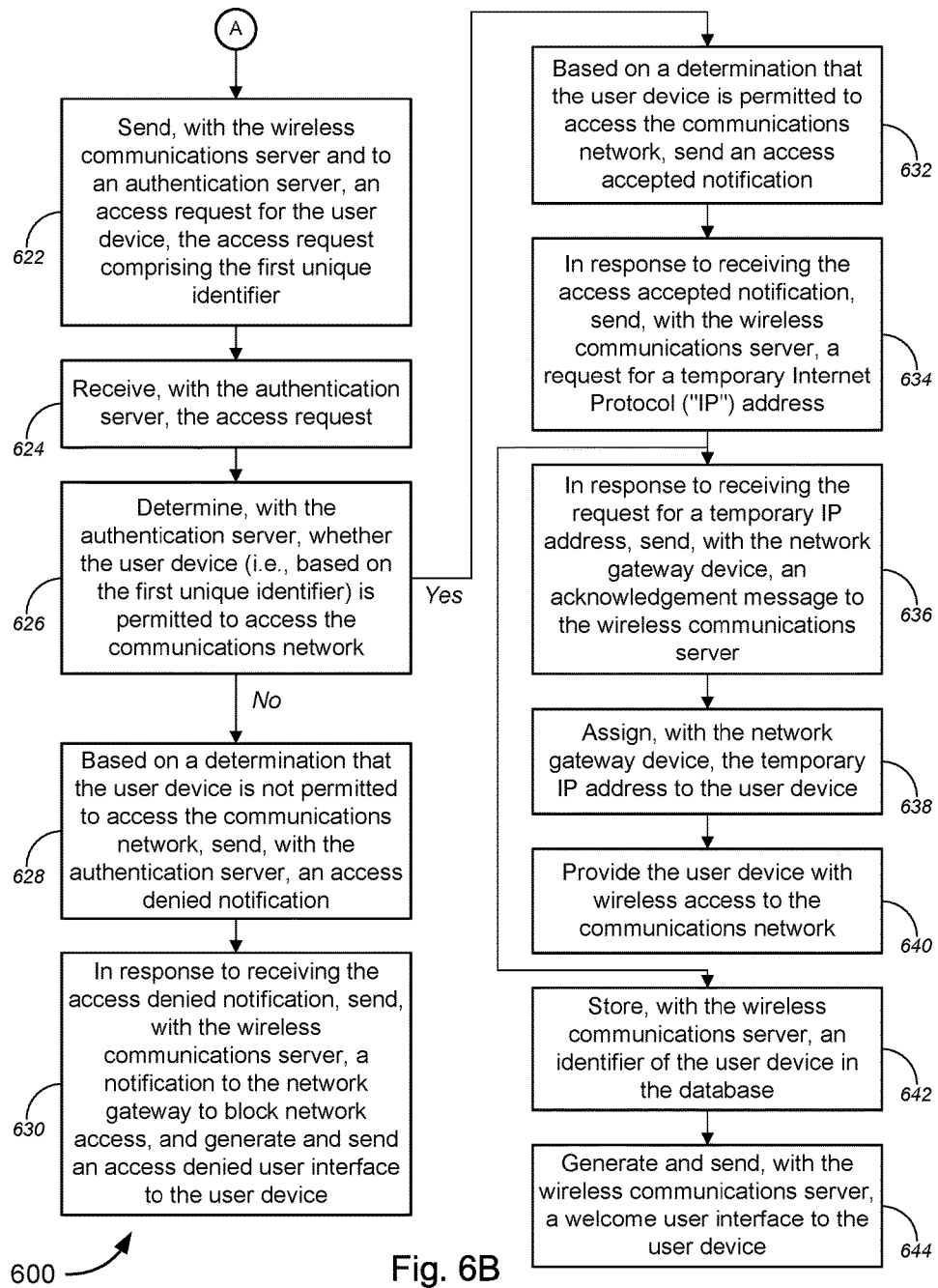
Figure 6C:
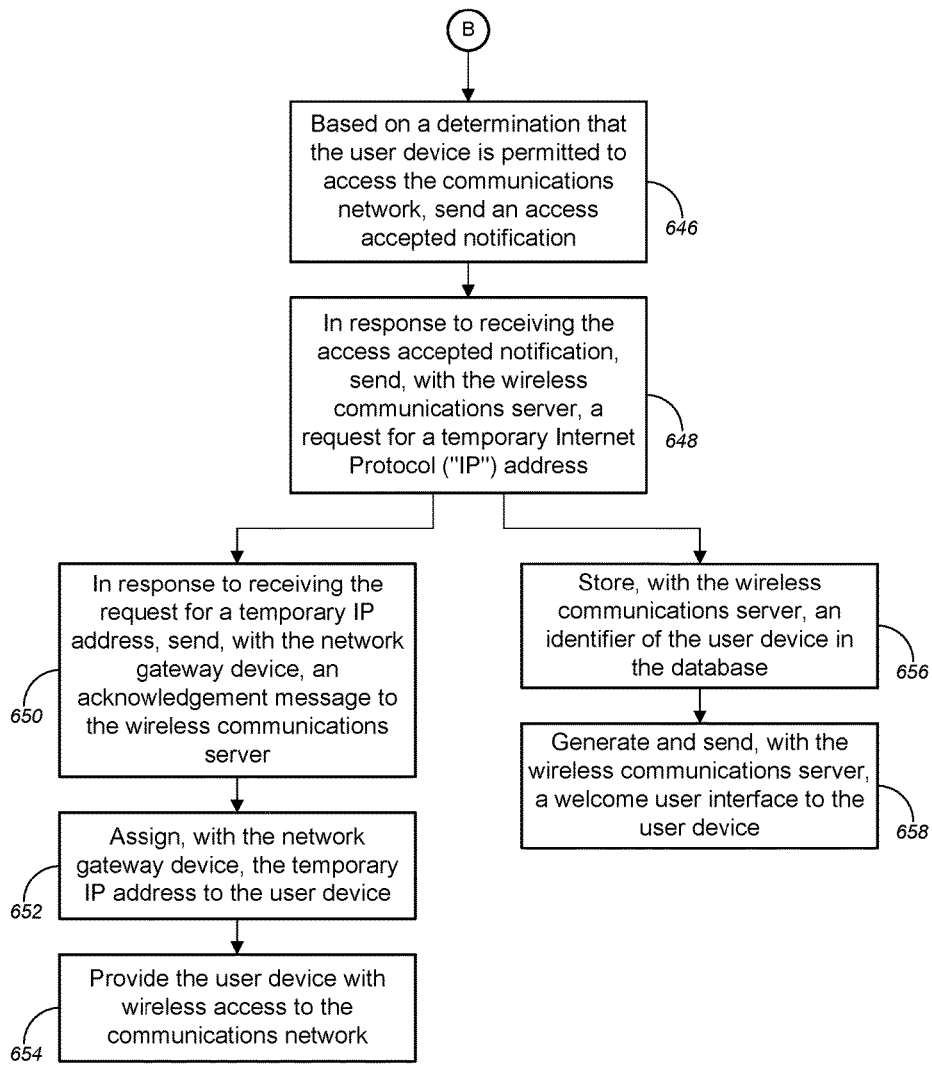

FIGS. 6A-6C (collectively, "FIG. 6") are flow diagrams illustrating another method 600 for implementing community wireless communications service, in accordance with various embodiments. Method 600 in FIG. 6A continues onto FIG. 6B following the circular marker denoted, "A," and continues from FIG. 6A onto FIG. 6C following the circular marker denoted, "B."

While the techniques and procedures are depicted and/or described in a certain order for purposes of illustration, it should be appreciated that certain procedures may be reordered and/or omitted within the scope of various embodiments. Moreover, while the method 600 illustrated by FIG. 6 can be implemented by or with (and, in some cases, are described below with respect to) the systems 100 and 200 of FIGS. 1 and 2, respectively (or components thereof), such methods may also be implemented using any suitable hardware (or software) implementation. Similarly, while each of the systems 100 and 200 of FIGS. 1 and 2, respectively (or components thereof), can operate according to the method 600 illustrated by FIG. 6 (e.g., by executing instructions embodied on a computer readable medium), the systems 100 and 200 of FIGS. 1 and 2 can each also operate according to other modes of operation and/or perform other suitable procedures.

With reference to FIG. 6A, method 600, at block 602, might comprise establishing, with a network gateway device (e.g., network gateway device 120 or 220 of FIGS. 1 and 2, respectively, or the like), a communications tunnel between the network gateway device and the customer gateway device using a tunneling protocol. In such cases, communication between the network gateway device and a user device (e.g., user device 105 or 205 of FIGS. 1 and 2, respectively, or the like) is through the communication tunnel via a customer gateway device (e.g., customer gateway device 110 or 210 of FIGS. 1 and 2, respectively, or the like). In some instances, the tunneling protocol might include generic routing encapsulation ("GRE") protocol, and the communications tunnel might include a GRE tunnel, as shown and described above, for example, in the embodiment of FIG. 2. At block 604, method 600 might comprise receiving, with the network gateway device and from the user device via the customer gateway device (and in some cases via a wireless access point (e.g., wireless access point 115 of FIG. 1 or the like)), a first request for wireless access to a communications network, the user device being unassociated with a customer who is associated with the customer gateway device. In other words, the user device requests network access (e.g., public Internet access) through a gateway and/or access point that is associated with someone else, who might be a friend, a family member, a stranger or other unknown/unaffiliated person, an unaffiliated company, etc.

Method 600 might further comprise determining, with the network gateway device, an identity of the user device (block 606) and, based on a determination that the user device is unassociated with the customer who is associated with the customer gateway device, sending, with the network gateway device and to a wireless communications server (e.g., wireless communications server 135 or 235 of FIGS. 1 and 2, respectively, or the like), a second request for wireless access to the communications network, the second request for network access comprising a first identifier associated with the user device (block 608). In some instances, the first identifier associated with the user device might include, without limitation, a media access control ("MAC") address and/or some other identifier associated with the user device. According to some embodiments, determining, with the network gateway device, the identity of the user device and sending, with the network gateway device and to the wireless communications server, the second request for wireless access to the communications network, based on the determination that the user device is unassociated with the customer who is associated with the customer gateway device, might comprise: obtaining, with the network gateway device, the first identifier from the user device; comparing, with the network gateway device, the first identifier with identifiers listed in an access control list ("ACL"); determining, with the network gateway device, whether the user device has permission to wirelessly access the communications network based on the comparison of the first identifier with identifiers listed in the ACL; and based on a determination that the user device does not have permission to wirelessly access the communications network, initiating, with the network gateway device, a hypertext transfer protocol ("HTTP") redirect operation, wherein the HTTP redirect operation comprises sending, with the network gateway device, the second request to the wireless communications server.

Method 600 might, at block 610, comprise receiving, with the wireless communications server, the second request, along with the first identifier. Method 600 might further comprise, at block 612, querying, with the wireless communications server, a database (e.g., database 150 of FIG. 1, or the like) to determine if access was previously granted to the user device. If not, method 600 proceeds to block 614. If so, method 600 proceeds to block 646 on FIG. 6C, following the marker, denoted, "B."

Based on a determination that access was not previously granted to the user device, method 600 might further comprise generating, with the wireless communications server, a login user interface ("UI") (block 614) and sending, with the wireless communications server, the generated login UI (block 616). In some embodiments, the login UI might include, but is not limited to, one of a login webpage, a login web form, a software application ("app") form, and/or the like, each of which prompts a user of the user device for a unique identifier (e.g., a unique identifier associated with either the user or the user device, or both). At block 618, method 600 might comprise forwarding, with the network gateway device and from the wireless communications server, the login UI to the user device. In some cases, forwarding the login UI might comprise receiving, with the network gateway device, the login UI from the wireless communications server and sending, with the network gateway device, the login UI to the user device via the customer gateway device (and any intermediary devices, nodes, servers, etc.).

The user might subsequently input the requested unique identifier or the user device might automatically input the requested unique identifier, and the user device might send the requested unique identifier (herein referred to as "first unique identifier") to the wireless communications server via the network gateway device. Method 600, at block 620, might comprise forwarding, with the network gateway device and from the user device, the first unique identifier to the wireless communications server, the first unique identifier being associated with the user device and being different from the first identifier. The first unique identifier, in some embodiments, might include, but is not limited to, a working telephone number ("WTN") or some other suitable identifier associated with the user device, and/or the like. In some instances, forwarding, with the network gateway device and from the user device, the first unique identifier to the wireless communications server might comprise receiving, with the network gateway device, the first unique identifier from the user device via the customer gateway device and sending, with the network gateway device, the first unique identifier to the wireless communications server. Method 600 then continues onto the process at block 622 in FIG. 6B, following the marker denoted, "A."

Turning to FIG. 6B, at block 622, method 600 might comprise sending, with the wireless communications server and to an authentication server, an access request for the user device. The access request might include, without limitation, the first unique identifier, in some cases, along with any other suitable identifier associated with the user and/or the user device. According to some embodiments, the wireless communications server might comprise a WiFi Community JavaScript ("JS") server, and the authentication server might comprise a remote authentication dial-in user service ("RADIUS") protocol server, where the WiFi Community JS server communicates with the RADIUS protocol server using RADIUS protocol. Alternatively, the wireless communications server might comprise a WiFi Community JavaScript ("JS") server, and the authentication server comprises a RADIUS server, where the WiFi Community JS server communicates with the RADIUS server using an application programming interface ("API"). Method 600 might further comprise receiving, with the authentication server, the access request (block 624) and determining, with the authentication server, whether the user device is permitted to access the communications network (block 626). In some embodiments, such determination might be made based on the first unique identifier (e.g., WTN or the like). Alternatively, or additionally, such determination might be made based on a further determination as to whether the user is a customer or subscriber of the network service provider associated with the network gateway device (and/or the like wireless communications server, and/or the authentication server, and the like), albeit typically through (or associated with) a different customer gateway device (e.g., a customer gateway device that is located at the customer premises associated with the user of the user device, the user's customer gateway device being geographically separate (i.e., such that the user device is outside the wireless transmission/reception range of the user's customer gateway device) from the location of the current customer gateway device through which the user device (or the user) is requesting network access). If it is determined that the user device is not permitted to access the network, method 600 proceeds to block 628. If it is determined that the user device is permitted to access the network, however, method 600 proceeds to block 632.

Based on a determination that the user device is not permitted to access the communications network, method 600 might further comprise, at block 628, sending, with the authentication server, an access denied notification. At block 630, method 600 might comprise, in response to receiving the access denied notification, sending, with the wireless communications server, a notification to the network gateway device to block network access by the user device, and generating and sending an access denied UI to the user device. In some cases (not shown), the access denied UI might include, without limitation, options for the user to input different first unique identifier and to try authentication again, which might cause the method to return to block 614 or 620.

Based on a determination that the user device is permitted to access the communications network, method 600 might comprise, at block 632, sending an access accepted notification. At block 634, method 600 might comprise, in response to receiving the access accepted notification, sending, with the wireless communications server, a request for a temporary Internet Protocol ("IP") address (which might, in some cases, be a care-of address or the like). Method 600 might further comprise, in response to receiving the request for temporary IP address, sending, with the network gateway device, an acknowledgement message to the wireless communications server (block 636), assigning, with the network gateway device, the temporary IP address to the user device (which, in some instances, might be performed using dynamic host configuration protocol ("DHCP") or the like) (block 638), and providing the user device with wireless access to the communications network (block 640). Method 600 might further comprise, concurrent with or parallel with the processes at blocks 636-640, storing, with the wireless communications server, an identifier of the user device in the database (block 642) and generating and sending, with the wireless communications server, a welcome user interface to the user device (block 644). According to some embodiments, the identifier that is stored in the database might include, without limitation, the MAC address of the user device, the WTN of the user device, and/or any other suitable identifier associated with one or both of the user and the user device, or the like. In some cases, along the identifier, a notification may further be stored in the database associating the identifier with devices that are permitted to (wirelessly) access the communications network). Upon being provided network access and/or receiving the welcome UI, the user device can proceed to exchange data other devices over the communications network, via the customer gateway device and the network gateway device (and any intermediary devices).

With reference to FIG. 6C, based on a determination that access was previously granted to the user device (during the process at block 612 of FIG. 6A), method 600, at block 646, might comprise, sending an access accepted notification. At block 648, method 600 might comprise, in response to receiving the access accepted notification, sending, with the wireless communications server, a request for a temporary IP address (which might, in some cases, be a care-of address or the like). Method 600 might further comprise, in response to receiving the request for temporary IP address, sending, with the network gateway device, an acknowledgement message to the wireless communications server (block 650), assigning, with the network gateway device, the temporary IP address to the user device (which, in some instances, might be performed using DHCP or the like) (block 652), and providing the user device with wireless access to the communications network (block 654). Method 600 might further comprise, concurrent with or parallel with the processes at blocks 650-654, storing, with the wireless communications server, an identifier of the user device in the database (block 656) and generating and sending, with the wireless communications server, a welcome user interface to the user device (block 658). According to some embodiments, the identifier that is stored in the database might include, without limitation, the MAC address of the user device, the WTN of the user device, and/or any other suitable identifier associated with one or both of the user and the user device, or the like. In some cases, along the identifier, a notification may further be stored in the database associating the identifier with devices that are permitted to (wirelessly) access the communications network). Upon being provided network access and/or receiving the welcome UI, the user device can proceed to exchange data other devices over the communications network, via the customer gateway device and the network gateway device (and any intermediary devices).

Exemplary System and Hardware Implementation

Figure 7:
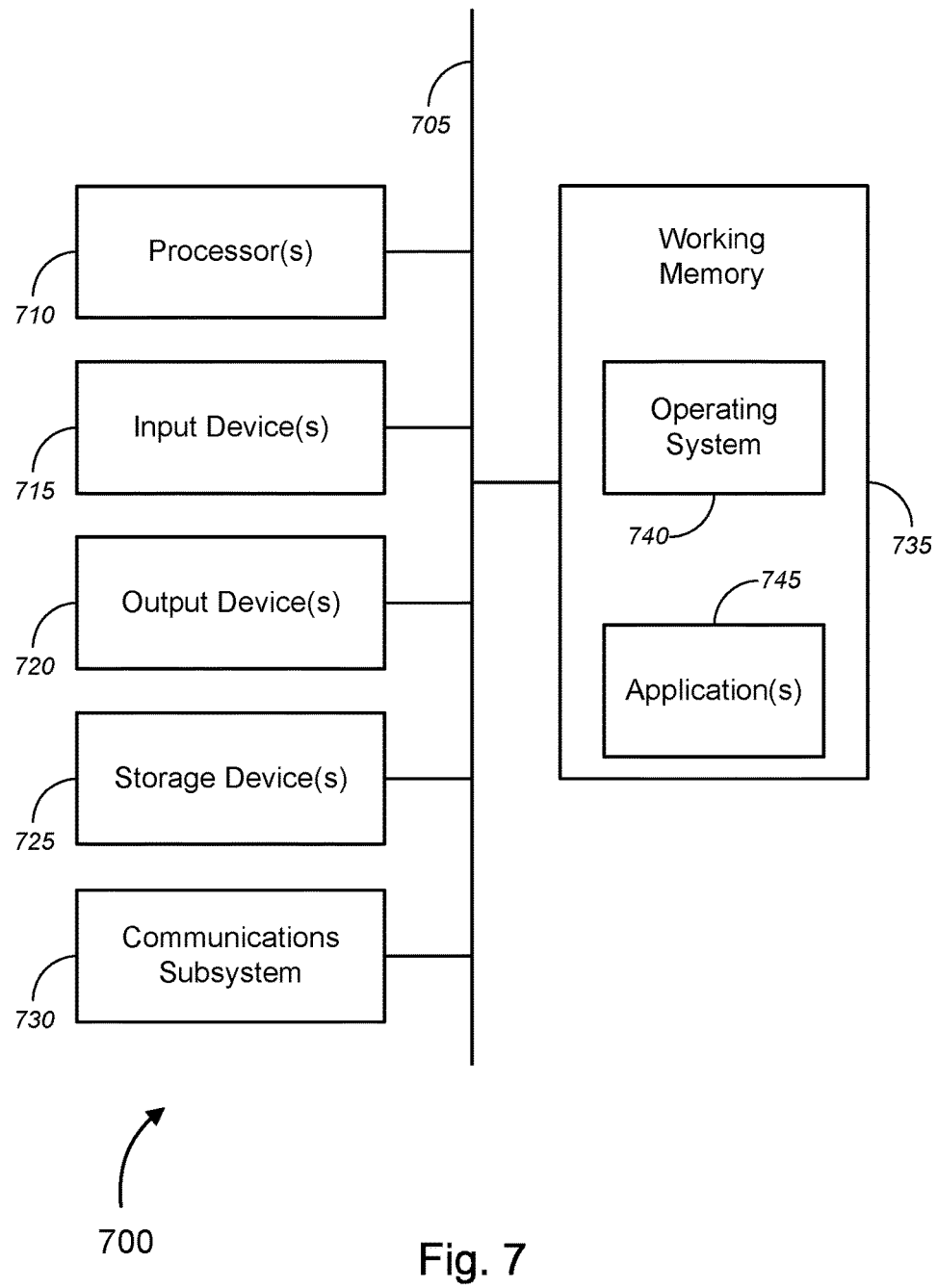
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., customer gateway device 110 or 210, wireless access point 115, network gateway device 120 and 220, digital subscriber line access multiplexer ("DSLAM") 125 and 225, broadband remote access server ("B-RAS") 130 and 230, wireless communications server 135 and 235, authentication server 140 and 240, data analytics server 155, etc.), or of any other device (e.g., user device 105, 105a-105e, and 205, etc.), as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system (i.e., customer gateway device 110 or 210, wireless access point 115, network gateway device 120 and 220, DSLAM 125 and 225, B-RAS 130 and 230, wireless communications server 135 and 235, authentication server 140 and 240, data analytics server 155, etc.), or of any other device (e.g., user device 105, 105a-105e, and 205, etc.), described above with respect to FIGS. 1-3 and 5—is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as digital signal processing chips, graphics acceleration processors, and/or the like); one or more input devices 715, which can include, without limitation, a mouse, a keyboard and/or the like; and one or more output devices 720, which can include, without limitation, a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 700 might also include a communications subsystem 730, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 725. Volatile media includes, without limitation, dynamic memory, such as the working memory 735. In some alternative embodiments, a computer readable medium may take the form of transmission media, which includes, without limitation, coaxial cables, copper wire, and fiber optics, including the wires that comprise the bus 705, as well as the various components of the communication subsystem 730 (and/or the media by which the communications subsystem 730 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

Figure 8:
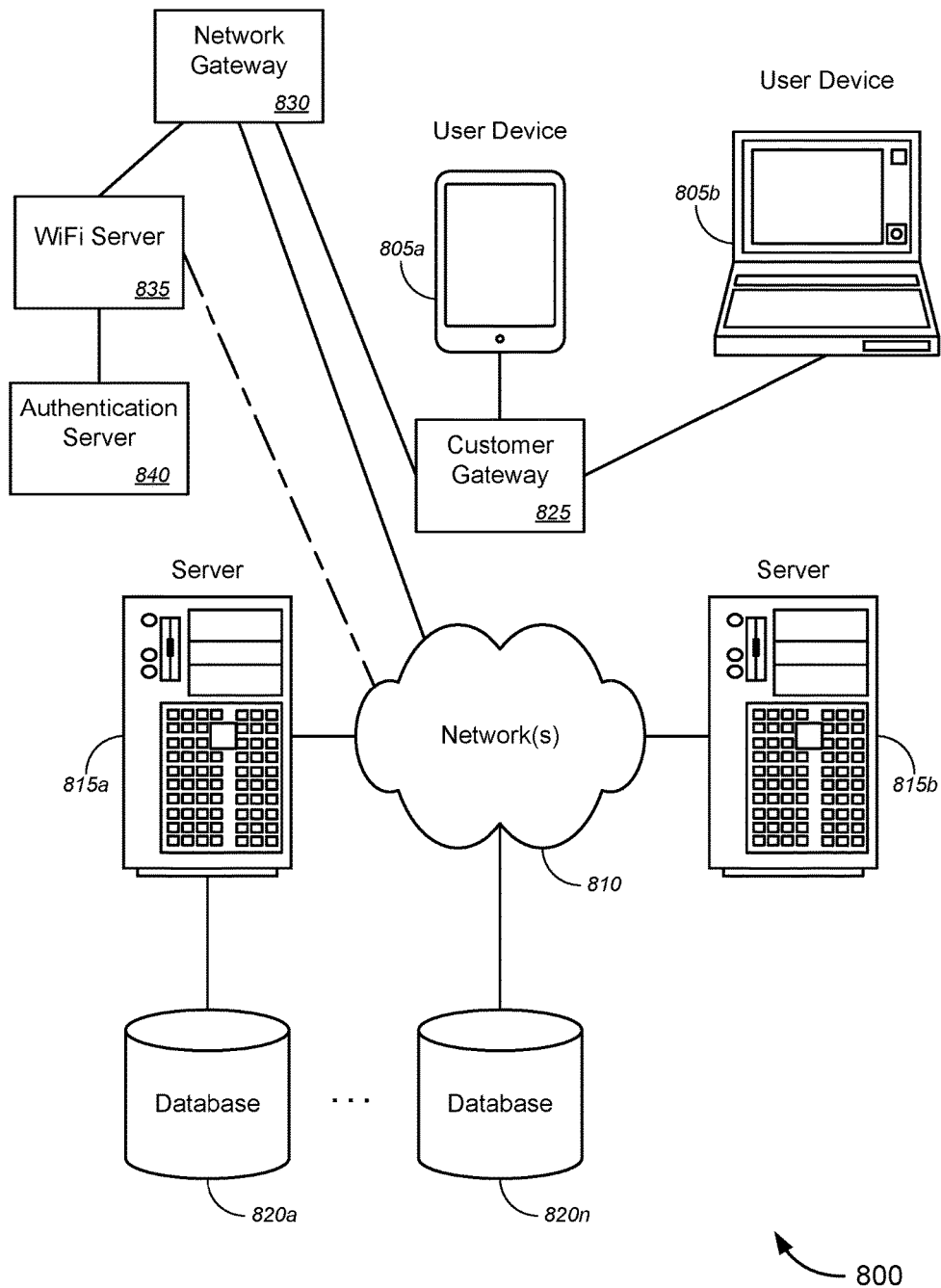
FIG. 8 is a block diagram illustrating an example of a networked system of computers, computing systems, or system hardware architecture, which can be used in accordance with various embodiments.

As noted above, a set of embodiments comprises methods and systems for implementing wireless communications service, and, in particular embodiments, to methods, systems, apparatus, and computer software for implementing community wireless communications service. FIG. 8 illustrates a schematic diagram of a system 800 that can be used in accordance with one set of embodiments. The system 800 can include one or more user computers, user devices, or customer devices 805. A user computer, user device, or customer device 805 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 805 can also have any of a variety of applications, including one or more applications configured to perform methods provided by various embodiments (as described above, for example), as well as one or more office applications, database client and/or server applications, and/or web browser applications. Alternatively, a user computer, user device, or customer device 805 can be any other electronic device, such as a thin-client computer, Internet-enabled mobile telephone, smart phone, and/or personal digital assistant, capable of communicating via a network (e.g., the network(s) 810 described below) and/or of displaying and navigating web pages or other types of electronic documents. Although the exemplary system 800 is shown with two user computers, user devices, or customer devices 805, any number of user computers, user devices, or customer devices can be supported.

Certain embodiments operate in a networked environment, which can include a network(s) 810. The network(s) 810 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 810 can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 815. Each of the server computers 815 may be configured with an operating system, including, without limitation, any of those discussed above, as well as any commercially (or freely) available server operating systems. Each of the servers 815 may also be running one or more applications, which can be configured to provide services to one or more clients 805 and/or other servers 815.

Merely by way of example, one of the servers 815 might be a data server, a web server, a cloud computing device(s), or the like, as described above. The data server might include (or be in communication with) a web server, which can be used, merely by way of example, to process requests for web pages or other electronic documents from user computers 805. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 805 to perform methods of the invention.

The server computers 815, in some embodiments, might include one or more application servers, which can be configured with one or more applications accessible by a client running on one or more of the client computers 805 and/or other servers 815. Merely by way of example, the server(s) 815 can be one or more general purpose computers capable of executing programs or scripts in response to the user computers 805 and/or other servers 815, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 805 and/or another server 815. In some embodiments, an application server can perform one or more of the processes for implementing wireless communications service, and, in particular embodiments, to methods, systems, apparatus, and computer software for implementing community wireless communications service, or the like, as described in detail above. Data provided by an application server may be formatted as one or more web pages (comprising HTML, JavaScript, etc., for example) and/or may be forwarded to a user computer 805 via a web server (as described above, for example). Similarly, a web server might receive web page requests and/or input data from a user computer 805 and/or forward the web page requests and/or input data to an application server. In some cases, a web server may be integrated with an application server.

In accordance with further embodiments, one or more servers 815 can function as a file server and/or can include one or more of the files (e.g., application code, data files, etc.) necessary to implement various disclosed methods, incorporated by an application running on a user computer 805 and/or another server 815. Alternatively, as those skilled in the art will appreciate, a file server can include all necessary files, allowing such an application to be invoked remotely by a user computer, user device, or customer device 805, server 815, and/or other servers or devices.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 820a-820n (collectively, "databases 820"). The location of each of the databases 820 is discretionary: merely by way of example, a database 820a might reside on a storage medium local to (and/or resident in) a server 815a. Alternatively, a database 820n can be remote from any or all of the servers 815, so long as it can be in communication (e.g., via the network 810) with one or more of these. In a particular set of embodiments, a database 820 can reside in a storage-area network ("SAN") familiar to those skilled in the art. (Likewise, any necessary files for performing the functions attributed to the server 815 can be stored locally on the respective computer and/or remotely, as appropriate.) In one set of embodiments, the database 820 can be a relational database, such as an Oracle database, that is adapted to store, update, and retrieve data in response to SQL-formatted commands. The database might be controlled and/or maintained by a database server, as described above, for example.

According to some embodiments, system 800 might further comprise a customer gateway device 825 to which one or more of the user computers, user devices, or customer devices 805 is communicatively coupled. System 800 might further comprise a network gateway device 830 communicatively coupled (either directly or indirectly) with the customer gateway device 825. System 800 might further comprise a WiFi or wireless communications server 835 and an authentication server 840. In some cases, one or both the wireless communications server 835 and/or the authentication server 840 might each be embodied by one of the servers 815a or 815b.

In operation, a user device 805 might request (wireless) access to a network 810. In response to receiving the request via the customer gateway device 825 (and any intermediary devices, nodes, switches, servers, etc.), the network gateway device 830 might determine whether the user device 805 is known (e.g., whether the user device 805 is already associated with the customer gateway device 825 or the network service provider, in some cases, via an access control list ("ACL") lookup or the like). If the user device 805 is determined to be unassociated with the customer gateway device 825 (or otherwise not known), the network gateway device 830 might send a second request (which might include an identifier associated with the user device, including, but not limited to, a media access control ("MAC") address associated with the user device) to the wireless communications server 835.

In embodiments in which a cache of user identification on a database (e.g., a MongoDB or some other persistent data store, and the like) to provide login-free access for the user of the user device after having previously gained access for the first time through login authentication (such as described above with respect to FIGS. 5 and 6), the wireless communications server 835 might query a database or data store 820 (which might correspond to database 150 in FIGS. 1 and 5) to determine whether or not the user device 805 has previously been granted access to the network 810. If so, the wireless communications server 835 might request that the network gateway device 830 assign a temporary Internet Protocol ("IP") address (which might include, without limitation, a care-of address or the like) to the user device 805, and might (optionally) store identification (e.g., the MAC address, a working telephone number ("WTN"), or other identifier associated with the user device 805) in the database 815, with an indication that the user device 805 has again been given access (although such storing of identification is redundant as the user device 805 is already in the database, this might allow for tracking of how often and when the user device 805 requests access). Meanwhile, the network gateway device 830 might send an acknowledgement of the request for temporary IP address back to the wireless communications server 835, while assigning the temporary IP address to the user device 805 and providing the user device 805 access to the network 810. In some instances, the wireless communications server 835 might generate and send a welcome user interface ("UI") to the user device 805. Upon being provided network access and/or receiving the welcome UI, the user device 805 can proceed to exchange data other devices over the network 810, via the customer gateway device 825 and the network gateway device 830 (and any intermediary devices).

In the case that it is determined that the user device 805 has not previously been granted access to the network 810 (either previously denied access or the current access request being a first access request) or in the embodiments that the user of the user device 805 is required to login each time that access to the network 810 is requested through the customer gateway device 825 that is not associated with the user, the wireless communications device 835 might generate and send a login UI to the user device 805 (via the network gateway 830 and via the customer gateway 825). The user or the user device 805 might send a unique identifier (including, but not limited to, a working telephone number ("WTN") or the like that is associated with the user device 805). Upon receiving the unique identifier, the wireless communications server 835 might send an access request to the authentication server 840, which might determine whether the user device 805 or the user associated therewith is permitted to access the network 810, e.g., if the user is a customer or subscriber of the network service provider, albeit typically through (or associated with) a different customer gateway device). If so, the authentication server 840 might return an access accepted notification. In response to receiving the access accepted notification, the wireless communications server 835 might request that the network gateway device 830 assign a temporary Internet Protocol ("IP") address (which might include, without limitation, a care-of address or the like) to the user device 805, and might (optionally, in the embodiments where the database is used as described above) store identification (e.g., the MAC address or other identifier associated with the user device 805) in the database 815, with an indication that the user device 805 has now been given access. Meanwhile, the network gateway device 830 might send an acknowledgement of the request for temporary IP address back to the wireless communications server 835, while assigning the temporary IP address to the user device 805 and providing the user device 805 access to the network 810. In some instances, the wireless communications server 835 might generate and send a welcome UI to the user device 805. Upon being provided network access and/or receiving the welcome UI, the user device 805 can proceed to exchange data other devices over the network 810, via the customer gateway device 825 and the network gateway device 830 (and any intermediary devices).

In the case that the authentication server determines that the user device 805 or the user associated therewith is not permitted to access the network 810, the authentication server 840 might return an access denied notification. In response to receiving the access denied notification, the wireless communications server 835 might notify the network gateway device 830 that access has been denied to the user device 805, and might (optionally, in the embodiments where the database is used as described above) store identification (e.g., the MAC address or other identifier associated with the user device 805) in the database 815, with an indication that the user device 805 has been denied access. Meanwhile, the network gateway device 830 might send an acknowledgement of the notice back to the wireless communications server 835, while blocking network access to the user device 805. In some instances, the wireless communications server 835 might generate and send an access denied UI to the user device 805.

These and other functionalities associated with the method and system for implementing community wireless communications service are described in greater detail above with respect to FIGS. 1-6.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

receiving, with a network gateway device and from a user device via a customer gateway device, a first request for wireless access to a communications network, the user device being unassociated with a customer who is associated with the customer gateway device;

determining, with the network gateway device, an identity of the user device;

based on a determination that the user device is unassociated with the customer who is associated with the customer gateway device, sending, with the network gateway device and to a wireless communications server, a second request for wireless access to the communications network, the second request for network access comprising a first identifier associated with the user device, wherein the wireless communications server comprises a WiFi Community JavaScript ("JS") server;

forwarding, with the network gateway device and from the wireless communications server, a login user interface to the user device, the login user interface comprising a prompt for a unique identifier;

forwarding, with the network gateway device and from the user device, a first unique identifier to the wireless communications server, the first unique identifier being associated with the user device and being different from the first identifier, wherein the wireless communications server forwards the first unique identifier to an authentication server for authentication;

in response to the authentication server authenticating the first unique identifier and sending an indication that network access is to be given to the user device, receiving, with the network gateway device and from the wireless communications server, a request for a temporary Internet Protocol ("IP") address to be assigned to the user device;

assigning, with the network gateway device, the temporary IP address to the user device; and providing, by the network gateway device, the user device with wireless access to the communications network.

2. The method of claim 1, further comprising:

establishing, with the network gateway device, a communications tunnel between the network gateway device and the customer gateway device using a tunneling protocol, wherein communication between the network gateway device and the user device is through the communication tunnel via the customer gateway device.

3. The method of claim 2, wherein the tunneling protocol includes generic routing encapsulation ("GRE") protocol, and wherein the communications tunnel includes a GRE tunnel.

4. The method of claim 1, wherein the first identifier associated with the user device comprises a media access control ("MAC") address associated with the user device.

5. The method of claim 1, wherein determining, with the network gateway device, the identity of the user device and sending, with the network gateway device and to the wireless communications server, the second request for wireless access to the communications network, based on the determination that the user device is unassociated with the customer who is associated with the customer gateway device, comprise:

obtaining, with the network gateway device, the first identifier from the user device;

comparing, with the network gateway device, the first identifier with identifiers listed in an access control list ("ACL");

determining, with the network gateway device, whether the user device has permission to wirelessly access the communications network based on the comparison of the first identifier with identifiers listed in the ACL; and based on a determination that the user device does not have permission to wirelessly access the communications network, initiating, with the network gateway device, a hypertext transfer protocol ("HTTP") redirect operation, wherein the HTTP redirect operation comprises sending, with the network gateway device, the second request to the wireless communications server.

6. The method of claim 1, wherein forwarding, with the network gateway device and from the wireless communications server, the login user interface to the user device comprises:

receiving, with the network gateway device, the login user interface from the wireless communications server; and sending, with the network gateway device, the login user interface to the user device via the customer gateway device.

7. The method of claim 1, wherein the login user interface comprises one of a login webpage or a login web form, which prompts a user of the user device for the unique identifier.

8. The method of claim 1, wherein forwarding, with the network gateway device and from the user device, the first unique identifier to the wireless communications server comprises:

receiving, with the network gateway device, the first unique identifier from the user device via the customer gateway device; and sending, with the network gateway device, the first unique identifier to the wireless communications server.

9. The method of claim 1, wherein the first unique identifier comprises a working telephone number ("WTN") associated with the user device.

10. The method of claim 1, wherein the authentication server comprises a remote authentication dial-in user service ("RADIUS") protocol server, and wherein the WiFi Community JS server communicates with the RADIUS protocol server using RADIUS protocol.

11. The method of claim 1, wherein the authentication server comprises a RADIUS server, and wherein the WiFi Community JS server communicates with the RADIUS server using an application programming interface ("API").

12. The method of claim 1, wherein assigning, with the network gateway device, the temporary IP address to the user device comprises assigning, with the network gateway device, the temporary IP address to the user device, using dynamic host configuration protocol ("DHCP").

13. The method of claim 1, wherein the temporary IP address comprises a care-of address.

14. The method of claim 1, wherein the communications network comprises the Internet.

15. An apparatus, comprising:

at least one processor; and a non-transitory computer readable medium in communication with the at least one processor, the non-transitory computer readable medium having stored thereon computer software comprising a set of instructions that, when executed by the at least one processor, causes the apparatus to:

receive, from a user device via a customer gateway device, a first request for wireless access to a communications network, the user device being unassociated with a customer who is associated with the customer gateway device;

determine an identity of the user device;

based on a determination that the user device is unassociated with the customer who is associated with the customer gateway device, send, to a wireless communications server, a second request for wireless access to the communications network, the second request for network access comprising a first identifier associated with the user device, wherein the wireless communications server comprises a WiFi Community JavaScript ("JS") server;

forward, from the wireless communications server, a login user interface to the user device, the login user interface comprising a prompt for a unique identifier;

forward, from the user device, a first unique identifier to the wireless communications server, the first unique identifier being associated with the user device and being different from the first identifier, wherein the wireless communications server forwards the first unique identifier to an authentication server for authentication;

in response to the authentication server authenticating the first unique identifier and sending an indication that network access is to be given to the user device, receive, from the wireless communications server, a request for a temporary Internet Protocol ("IP") address to be assigned to the user device;

assign the temporary IP address to the user device; and provide the user device with wireless access to the communications network.

16. The apparatus of claim 15, wherein the first identifier associated with the user device comprises a media access control ("MAC") address associated with the user device.

17. The apparatus of claim 15, wherein the login user interface comprises one of a login webpage or a login web form, which prompts a user of the user device for the unique identifier.

18. The apparatus of claim 15, wherein the unique identifier comprises a working telephone number ("WTN") associated with the user device.

19. A system, comprising:
a user device, comprising:
at least one first processor; and
a first non-transitory computer readable medium in communication with the at least one first processor, the first non-transitory computer readable medium having stored thereon computer software comprising a first set of instructions that, when executed by the at least one first processor, causes the user device to:
send a first request for wireless access to a communications network;
a customer gateway device, wherein the user device is unassociated with a customer who is associated with the customer gateway device, the customer gateway device comprising:
at least one second processor; and
a second non-transitory computer readable medium in communication with the at least one second processor, the second non-transitory computer readable medium having stored thereon computer software comprising a second set of instructions that, when executed by the at least one second processor, causes the customer gateway device to:
forward the first request to the network gateway device;
a network gateway device, comprising:
at least one third processor; and
a third non-transitory computer readable medium in communication with the at least one third processor, the third non-transitory computer readable medium having stored thereon computer software comprising a third set of instructions that, when executed by the at least one third processor, causes the network gateway device to:
receive, from the user device via the customer gateway device, the first request for wireless access to the communications network;
determine an identity of the user device; and
based on a determination that the user device is unassociated with the customer who is associated with the customer gateway device, send, to a wireless communications server, a second request for wireless access to the communications network, the second request for network access comprising a first identifier associated with the user device;
a wireless communications server, comprising:
at least one fourth processor; and
a fourth non-transitory computer readable medium in communication with the at least one fourth processor, the fourth non-transitory computer readable medium having stored thereon computer software comprising a fourth set of instructions that, when executed by the at least one fourth processor, causes the wireless communications server to:
receive the second request for wireless access to the communications network; and
in response to receiving the second request, send a login user interface to the user device via the network gateway device, the login user interface comprising a prompt for a unique identifier, via the network gateway device; and
an authentication server, comprising:
at least one fifth processor; and
a fifth non-transitory computer readable medium in communication with the at least one fifth processor, the fifth non-transitory computer readable medium having stored thereon computer software comprising a fifth set of instructions that, when executed by the at least one fifth processor, causes the authentication server to perform one or more functions;
wherein the second set of instructions, when executed by the at least one second processor, further causes the user device to:
receive the login user interface;
display the login user interface;
receive a first unique identifier from the user; and
send the first unique identifier to the authentication server via the network gateway device and the wireless communications server;
wherein the fifth set of instructions, when executed by the at least one fifth processor, causes the authentication server to:
receive the first unique identifier;
determine whether the user device is authorized to wirelessly access the communications network, based on the received first unique identifier; and
based on a determination that the user device is authorized to wirelessly access the communications network, send an indication to the wireless communications server that the user device is authorized to wirelessly access the communications network;
wherein the fourth set of instructions, when executed by the at least one fourth processor, further causes the wireless communications server to:
receive the indication that the user device is authorized to wirelessly access the communications network; and
in response to receiving the indication, send a request for a temporary Internet Protocol ("IP") address to the network gateway device;
wherein the third set of instructions, when executed by the at least one third processor, further causes the network gateway device to:
receive the request for the temporary IP address;
in response to receiving the request for the temporary IP address, generate the temporary IP address;
assign the temporary IP address to the user device; and
provide the user device with wireless access to the communications network;
wherein the wireless communications server comprises a WiFi Community JavaScript ("JS") server.

20. The system of claim 19, wherein the authentication server comprises a remote authentication dial-in user service ("RADIUS") protocol server.

* * * * *